United States Patent
Dahn

(10) Patent No.: US 11,526,892 B2
(45) Date of Patent: Dec. 13, 2022

(54) PAYMENT APPLICATION BASED FUND TRANSFER

(71) Applicant: Block, Inc., San Francisco, CA (US)

(72) Inventor: Michael Dahn, San Francisco, CA (US)

(73) Assignee: Block, Inc., San Francisco, CA (US)

(*) Notice: Subject to any disclaimer, the term of this patent is extended or adjusted under 35 U.S.C. 154(b) by 198 days.

(21) Appl. No.: 15/283,019

(22) Filed: Sep. 30, 2016

(65) Prior Publication Data

US 2018/0096351 A1   Apr. 5, 2018

(51) Int. Cl.
| | |
|---|---|
| G06Q 20/10 | (2012.01) |
| G06Q 20/08 | (2012.01) |
| G06Q 20/22 | (2012.01) |
| G06Q 20/40 | (2012.01) |
| G06Q 20/38 | (2012.01) |

(52) U.S. Cl.
CPC ....... *G06Q 20/405* (2013.01); *G06Q 20/0855* (2013.01); *G06Q 20/1085* (2013.01); *G06Q 20/223* (2013.01); *G06Q 20/38* (2013.01)

(58) Field of Classification Search
None
See application file for complete search history.

(56) References Cited

U.S. PATENT DOCUMENTS

| | | | |
|---|---|---|---|
| 5,629,981 A | 5/1997 | Nerlikar | |
| 5,992,570 A | 11/1999 | Walter et al. | |
| 6,473,500 B1 | 10/2002 | Risafi et al. | |
| 7,711,620 B2 * | 5/2010 | Abifaker | G06Q 20/10 705/26.1 |
| 7,953,654 B2 * | 5/2011 | Abifaker | G06Q 30/02 705/35 |
| 7,983,951 B2 * | 7/2011 | Frohwein | G06Q 20/10 |
| 8,065,226 B2 | 11/2011 | Rizzo et al. | |
| 8,160,943 B2 * | 4/2012 | Smith | G06Q 20/32 705/35 |
| 8,175,972 B2 * | 5/2012 | Galit | G06Q 20/10 705/35 |
| 8,220,706 B1 | 7/2012 | Miller et al. | |

(Continued)

OTHER PUBLICATIONS

Daniel Wolfe. "An E-Variation on Payday Loan Theme". American Banker. Published Jul. 28, 2005, 1:00am EDT. https://www.americanbanker.com/news/an-e-variation-on-payday-loan-theme (Year: 2005).*

(Continued)

*Primary Examiner* — Ayal I. Sharon
(74) *Attorney, Agent, or Firm* — Polsinelli PC

(57) ABSTRACT

Various embodiments are related to apparatuses and methods for enabling a sender to perform monetary transactions for a requestor. A sender can use, for example, a payment application associated with a payment processing system to perform a monetary transaction for a requestor. The payment processing system can send information related to the monetary transaction to, for example, a sender-requestor association component. When the monetary transaction is a deposit, the sender can receive funds for the deposit from the requestor. The platform can debit the requestor's financial account for the deposit amount and credit the sender's financial account with the debit account as a physical cash transaction occurs between the sender and the requestor.

15 Claims, 8 Drawing Sheets

(56) References Cited

U.S. PATENT DOCUMENTS

| | | | |
|---|---|---|---|
| 8,255,278 B1 | 8/2012 | Young et al. | |
| 8,326,770 B1* | 12/2012 | Weisman | G06Q 50/01 |
| | | | 705/319 |
| 8,407,121 B2* | 3/2013 | Paintin | G06Q 20/3224 |
| | | | 705/35 |
| 8,412,630 B2* | 4/2013 | Ross | G06Q 50/01 |
| | | | 705/14.1 |
| 8,494,960 B2* | 7/2013 | Galit | G06Q 20/10 |
| | | | 705/35 |
| 8,538,845 B2* | 9/2013 | Liberty | G06Q 40/02 |
| | | | 705/35 |
| 8,538,879 B2* | 9/2013 | Galit | G06Q 20/06 |
| | | | 705/35 |
| 8,548,334 B2* | 10/2013 | Mazed | H04B 10/272 |
| | | | 398/140 |
| 8,560,436 B2* | 10/2013 | Ingram | G06Q 40/025 |
| | | | 705/26.1 |
| 8,566,203 B1 | 10/2013 | Vieira et al. | |
| 8,694,401 B2* | 4/2014 | Stewart | G06Q 40/02 |
| | | | 705/35 |
| 9,047,600 B2* | 6/2015 | Zhou | G06Q 20/322 |
| 9,135,612 B1* | 9/2015 | Proctor, Jr. | G06Q 30/0266 |
| 9,202,250 B1* | 12/2015 | Palaniappan | G06Q 40/125 |
| 9,300,676 B2* | 3/2016 | Madhu | G06Q 50/265 |
| 9,519,901 B1* | 12/2016 | Dorogusker | G06Q 20/401 |
| 9,552,573 B2* | 1/2017 | Kulpati | G06Q 20/3223 |
| 9,576,284 B2* | 2/2017 | Runyan | G06Q 20/3224 |
| 9,626,664 B2* | 4/2017 | Bouey | G06Q 20/405 |
| 9,665,858 B1* | 5/2017 | Kumar | G06Q 20/42 |
| 9,743,261 B2* | 8/2017 | Todasco | H04W 12/08 |
| 9,767,503 B2* | 9/2017 | Grigg | G06Q 30/0261 |
| 9,786,005 B1* | 10/2017 | Poursartip | G06Q 10/06315 |
| 9,836,727 B1 | 12/2017 | Brennan et al. | |
| 9,875,471 B1* | 1/2018 | Myrick | G06Q 10/06314 |
| 9,911,114 B2* | 3/2018 | Rackley, III | G06Q 20/02 |
| 9,961,076 B2* | 5/2018 | Stoops | H04L 63/0861 |
| 9,978,068 B2* | 5/2018 | Butterfield | G06Q 20/405 |
| 9,978,076 B2* | 5/2018 | Mathew | G06Q 40/025 |
| 9,984,412 B1* | 5/2018 | Poursartip | G06Q 40/025 |
| 10,026,076 B2* | 7/2018 | Kumar | G06Q 20/10 |
| 10,027,684 B1 | 7/2018 | Paterson et al. | |
| 10,043,162 B1* | 8/2018 | Renke | G06Q 20/405 |
| 10,108,940 B2* | 10/2018 | Kosloski | G06Q 50/01 |
| 10,163,171 B1* | 12/2018 | Vippagunta | G06Q 20/10 |
| 10,217,093 B2* | 2/2019 | Trivedi | G06Q 20/10 |
| 10,223,707 B2* | 3/2019 | Granville, III | G06Q 30/0207 |
| 10,354,246 B1 | 7/2019 | Janiga | |
| 10,373,281 B2* | 8/2019 | Lutnick | G06Q 20/202 |
| 2002/0170959 A1 | 11/2002 | Madani | |
| 2003/0144956 A1 | 7/2003 | Yu, Jr. et al. | |
| 2003/0216960 A1 | 11/2003 | Postrel | |
| 2003/0233278 A1* | 12/2003 | Marshall | G06Q 30/0212 |
| | | | 705/14.35 |
| 2004/0068552 A1 | 4/2004 | Kotz et al. | |
| 2004/0267667 A1 | 12/2004 | Ohara | |
| 2006/0025159 A1 | 2/2006 | Estevez et al. | |
| 2006/0206709 A1 | 9/2006 | Labrou et al. | |
| 2007/0092112 A1 | 4/2007 | Awatsu et al. | |
| 2008/0301049 A1 | 12/2008 | Dyson | |
| 2009/0024506 A1 | 1/2009 | Houri | |
| 2009/0114716 A1 | 5/2009 | Ramachandran | |
| 2010/0114677 A1 | 5/2010 | Carlson et al. | |
| 2011/0016047 A1 | 1/2011 | Wu et al. | |
| 2011/0238573 A1 | 9/2011 | Varadarajan | |
| 2011/0251956 A1 | 10/2011 | Cantley et al. | |
| 2012/0173311 A1 | 7/2012 | Chang et al. | |
| 2012/0239570 A1 | 9/2012 | Wolfs et al. | |
| 2013/0031009 A1* | 1/2013 | Kapoor | G06Q 30/06 |
| | | | 705/77 |
| 2013/0046589 A1* | 2/2013 | Grigg | G06Q 30/02 |
| | | | 705/14.1 |
| 2013/0046697 A1 | 2/2013 | Schibuk | |
| 2013/0054369 A1* | 2/2013 | Grigg | G06Q 30/02 |
| | | | 705/14.58 |
| 2013/0085931 A1* | 4/2013 | Runyan | G06Q 20/322 |
| | | | 705/40 |
| 2013/0124411 A1 | 5/2013 | Kobres et al. | |
| 2013/0144783 A1 | 6/2013 | Bishop | |
| 2013/0178233 A1 | 7/2013 | McCoy et al. | |
| 2013/0191232 A1 | 7/2013 | Calman et al. | |
| 2013/0232064 A1 | 9/2013 | Bosch | |
| 2013/0238497 A1 | 9/2013 | Ramachandran et al. | |
| 2013/0262303 A1 | 10/2013 | Metral | |
| 2013/0290172 A1* | 10/2013 | Mashinsky | G06Q 20/12 |
| | | | 705/39 |
| 2014/0156435 A1* | 6/2014 | Rahman | G06Q 20/10 |
| | | | 705/21 |
| 2014/0156512 A1* | 6/2014 | Rahman | G06Q 20/10 |
| | | | 705/39 |
| 2014/0195427 A1* | 7/2014 | Reeve | G06Q 20/32 |
| | | | 705/42 |
| 2014/0195436 A1 | 7/2014 | Schleicher | |
| 2014/0235205 A1 | 8/2014 | Paluch et al. | |
| 2014/0279490 A1 | 9/2014 | Calman et al. | |
| 2014/0335787 A1 | 11/2014 | Smadi et al. | |
| 2015/0001289 A1 | 1/2015 | Smith et al. | |
| 2015/0235190 A1 | 8/2015 | Urban | |
| 2015/0254655 A1 | 9/2015 | Bondesen et al. | |
| 2015/0302411 A1 | 10/2015 | Bondesen et al. | |
| 2015/0310470 A1 | 10/2015 | Mathew et al. | |
| 2015/0339638 A1 | 11/2015 | DeLuca | |
| 2016/0104140 A1 | 4/2016 | Harrow et al. | |
| 2016/0140521 A1* | 5/2016 | Trivedi | G06Q 20/10 |
| | | | 705/39 |
| 2017/0124542 A1* | 5/2017 | Sharan | G06Q 20/102 |
| 2018/0005223 A1* | 1/2018 | Terra | G06Q 20/352 |
| 2018/0204204 A1 | 7/2018 | Giraudo et al. | |

OTHER PUBLICATIONS

Wikipedia. "Payday Loan". Sep. 20, 2016. https://en.wikipedia.org/w/index.php?title=Payday_loan&oldid=740410133 (Year: 2016).*
Final Office Action dated Apr. 27, 2018, for U.S. Appl. No. 14/662,144, of Janiga, M.W., filed Mar. 18, 2015.
Final Office Action dated Feb. 24, 2017, for U.S. Appl. No. 14/098,336, of Wilson, M., et al., filed Dec. 5, 2013.
Non-Final Office Action dated Sep. 27, 2017, for U.S. Appl. No. 14/098,336, of Wilson, M., et al., filed Dec. 5, 2013.
Non-Final Office Action dated Jan. 15, 2015, for U.S. Appl. No. 14/098,336, of Wilson, M., et al., filed Dec. 5, 2013.
Non-Final Office Action dated Sep. 10, 2015, for U.S. Appl. No. 14/098,336, of Wilson, M., et al., filed Dec. 5, 2013.
Non-Final Office Action dated Mar. 24, 2016, for U.S. Appl. No. 14/098,336, of Wilson, M., et al., filed Dec. 5, 2013.
Non-Final Office Action dated Sep. 9, 2016, for U.S. Appl. No. 14/098,336, of Wilson, M., et al., filed Dec. 5, 2013.
Non-Final Office Action dated Sep. 21, 2017, for U.S. Appl. No. 14/662,144, of Janiga, M.W., filed Mar. 18, 2015.
Non-Final Office Action dated Aug. 10, 2018, for U.S. Appl. No. 14/662,144, of Janiga, M.W., filed Mar. 18, 2015.
Buczkowski, A., "Location-based marketing," The Academic Framework, pp. 1-77 (Feb. 2012).
Notice of Allowance dated Feb. 25, 2019, for U.S. Appl. No. 14/662,144, of Janiga, M.W., filed Mar. 18, 2015.
Non-Final Office Action dated Jul. 24, 2020 for U.S. Appl. No. 16/430,379, of Janiga, M. W. et al., filed Jun. 3, 2019.
Final Office Action dated Apr. 21, 2021 for U.S. Appl. No. 16/430,379, of Janiga, M. W. et al., filed Jun. 3, 2019.
Non-Final Office Action dated Apr. 21, 2021 for U.S. Appl. No. 16/430,379, of Janiga, M. W. et al., filed Jun. 3, 2019.
Final Office Action dated Mar. 8, 2022 for U.S. Appl. No. 16/430,379, of Janiga, M. W. et al., filed Jun. 3, 2019.

* cited by examiner

PAYMENT APPLICATION BASED FUND TRANSFER

BACKGROUND

Banking, as done today with banks or credit unions, allow withdrawal and deposit of cash. Upon creation of an account with a bank, the participant is able to perform transactions with the bank or credit union, such as make a deposit or request withdrawal of physical cash. Physical cash continues to play a key role in consumer spending such as for small-value transactions, as a key alternative when other options are not available, or in cases where cash transactions are both easier and quicker than other alternatives. In certain cases, including that of mostly lower-income consumers who lack access to alternative payment options or find them too costly or difficult to obtain, cash is also used for relatively larger-value transactions.

To get physical cash, the participant generally makes a cash withdrawal request at a branch office of the bank or credit union, or uses an ATM. To make a deposit in a branch office, the participant typically identifies her account to a teller, and establishes their identity by providing a form of government issued identification. The teller arranges for the account of the participant to be debited for the amount of the withdrawal. When the account has sufficient funds available for the withdrawal, the teller provides funds in the amount of the withdrawal to the participant. To make a withdrawal using an ATM, the participant inserts an ATM or debit card into an ATM. The participant then enters her PIN into the ATM, and the ATM validates the PIN. Once validated, the ATM verifies that the participant's account has sufficient funds available for the withdrawal. If the funds are available, the ATM provides funds in the amount of the withdrawal to the participant.

The availability of cash is limited by the availability of nearby banks and ATMs. Furthermore, some ATMs charge unreasonable fees for cash withdrawals. In some instances, ATMs may be located in unsafe or remote areas, making it difficult for an individual to access cash when he or she needs it.

BRIEF DESCRIPTION OF THE DRAWINGS

Embodiments of the present disclosure will be described and explained through the use of the accompanying drawings in which.

Figure 1A:
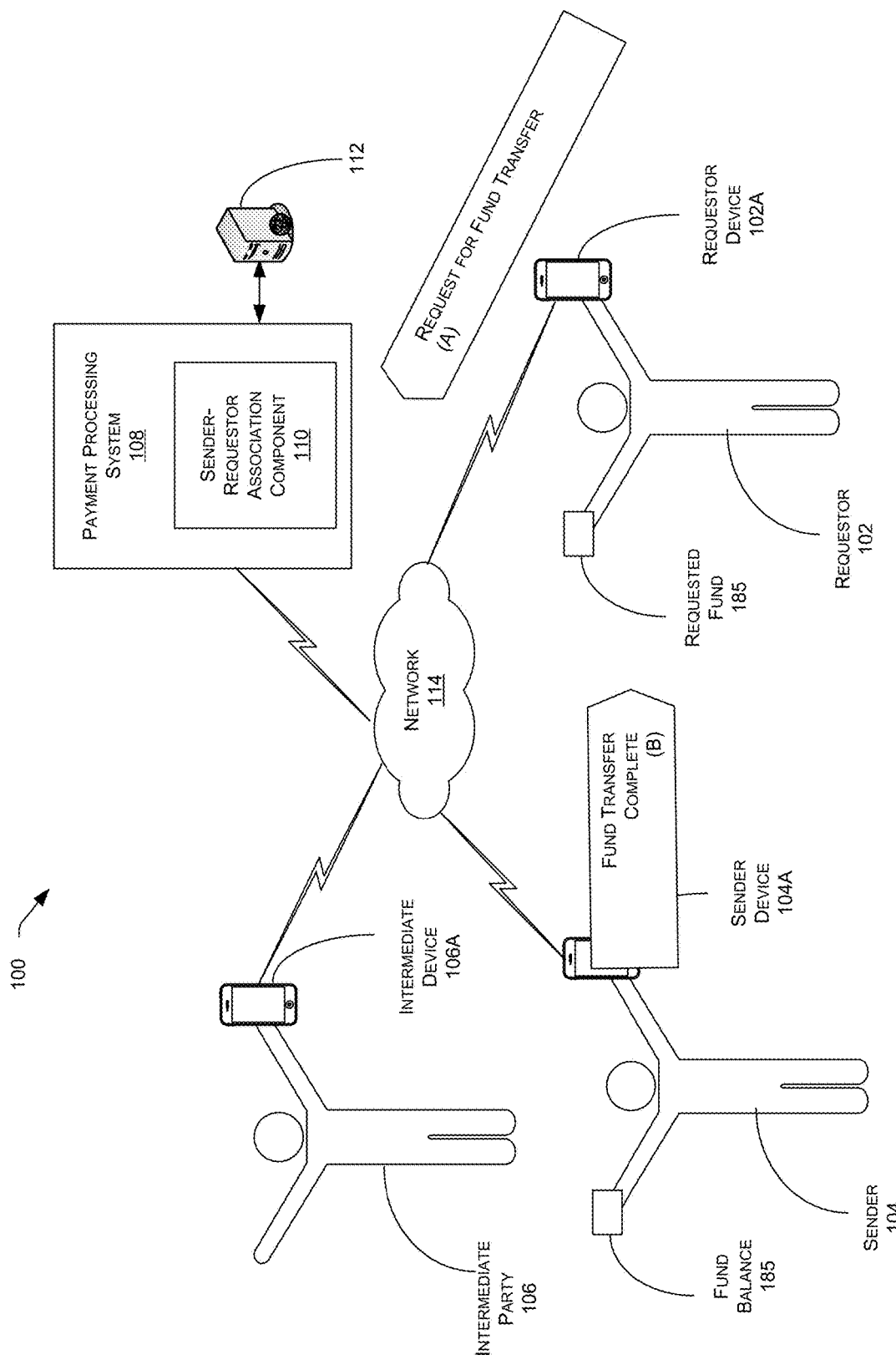
FIG. 1A is a diagram illustrating components of or associated with a first embodiment of a system to enable a sender to perform monetary transactions.

The drawings are not necessarily drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the technology of the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

The present subject matter discloses technology related to enabling a participant to perform monetary transactions, such as a deposit or withdrawal of physical cash, through a payment application. A participant using the payment application can perform monetary transactions, such as request for physical cash through the payment application, where the payment application determines either an indirect connection between a participant and a network of users that may have indicated an ability to offer physical cash in exchange for digital payment, again through the payment application. The network of users may be in proximity to the participant requesting for the physical cash. In some implementations, the network of users may be determined based on participant's social network, within a certain degree of separation from the participant, or outside participant's social network but meeting a predefined criteria, such as in a certain geographical location, or having a specific transaction history, a certain cash balance, and so on.

The methods and system disclosed herein can send information related to the monetary transaction to, for example, a sender-requestor association component. The sender-requestor association component can enable requestors (hereinafter referred to as requestor of the funds) be paired or otherwise connected with potential users of the application (hereinafter referred to as senders as they are holder of the funds). The sender-requestor association component can deposit the funds from the electronic payments into the sender's financial account.

When the monetary transaction is a deposit, the sender can provide the deposit amount to the requestor. The sender-requestor association component can credit the requestor's financial account for the deposit amount. The platform can accomplish the credit of the account by diverting a portion of the sender's electronic payment funds corresponding to the deposit amount to the requestor's financial account.

Many people do not have convenient access to banks and/or credit unions when they need access. For example, a person in a rural area may need to drive a significant distance to go to a bank, or a worker getting off work at midnight may not be able to find an open bank. In another example, a friend in need may not have access to cash but a stranger in the vicinity may do. The friend may hesitate to request the stranger for cash, primarily due to security reasons. In another example, the person may not have access to an ATM. Utilizing the disclosed technology, these people can perform monetary transactions with a sender who is capable of offering cash, irrespective of whether or not the sender is connected directly to the requestor. For example, the person in the rural area can make a deposit to a financial account of a network contact, and the contact can make an equivalent deposit to the sender's account (where the sender is in proximity to the requestor) so that the sender can offer physical cash to the requestor. Thus, a third party such as a network contact can initiate a fund transfer between a known contact, such as the requestor, and an unknown contact, such as the sender. In other cases, the fund transfer may be a two party communication with the network contact playing the role of the sender. The contacts may be stored in a contacts database of "trusted contacts" list in response to one or more signals from requestor device and associate with an account of the requestor. The trusted contacts list may comprise, for example, contact information for one or more contacts from the user's social networking profile or a phone contacts list. The user of requestor device may designate which contacts are "trusted contacts" using the mobile payment application or past interactions. The network contact, the sender and the requestor are collectively referred to as participant hereinafter.

Utilizing the disclosed technology, a requestor at a bar may request the sender to provide $10 in cash to tip the bartender. The sender may then be furnished with the $10 in digital payment either by requestor's account or an account of a third party that initiated the request.

Further, many people around the world do not have an account with a bank or a credit union. Resultantly, a person may not have a safe place to keep her money. There are many reasons why a person may not be able to open an account. For example, the person may not have a government-issued ID (identification) to use to open the account, or the person may not have an address, which can be required to open an account. For such people, not having reasonable access to an account where money can be safely kept creates a hardship. Utilizing the disclosed technology, a person without a government issued ID or an address can go to a dedicated sender in each zip code that offers physical cash in lieu of digital payment. Thus, the sender can further perform monetary transactions for the person, for example providing physical funds into the financial account instead of having the person carry physical cash around. Additionally, in some cases, the requestor's request may be split into a number of multiple requests of the requested amount split and directed to multiple senders. Again, this allows the requestor to not request a large amount from a single person, since individuals do not carry a large amount of cash and it is more conceivable to obtain small amounts from multiple people than the reverse.

Walking through a simple example may be helpful in understanding the disclosed technology. The following non-limiting example is provided to help in understanding the basics of the disclosed technology. In one scenario, the sender, network contact, and the requestor use the payment application executing on their respective mobile devices to send and receive digital payment. The payment application is communicatively connected to the processing system.

A sender uses a payment processing system to open and/or associate a cash account within the payment application for a requestor and/or a network contact of the requestor, where the cash account indicates the amount and conditions that the sender applies for offering physical cash. A requestor uses the payment processing system via the payment application to request another participant, such as the sender or the network contact on behalf of the requestor, for physical cash. A third-party, such as network contact, uses the payment processing system via the payment application to receive request of physical cash from requestor, request another participant, such as the sender on behalf of the requestor, for physical cash, open and/or associate a cash account within the payment application, where the cash account indicates the amount and conditions that the network account applies for offering physical cash to the sender on behalf of the requestor and/or directly to the requestor.

To facilitate a secure interaction between the various participants, the identities, credit worthiness, debit worthiness, and risk ratings may be determined by payment processing system. For this, the payment processing system can communicate with a computer system that has access to personal information databases. For example, the computer system can obtain personal information from databases of credit reporting agencies, such as Experian, Equifax, and TransUnion to determine the credit worthiness of the participant. In another example, the computer system can obtain personal information from databases of background agencies to determine if the participant is associated with any suspicious or fraudulent activity. In another example, the computer system can obtain personal information from databases to determine identify of the participant.

The computer system, using personal information from the databases, can create and transmit personal questions to the payment processing system, which the participant can answer to establish identity. For example, the computer system could ask what was the requestor's residence address five years ago, or what is the current outstanding balance for the requestor's cell phone. The computer system could provide several possible answers from which the requestor would choose. If the requestor is able to answer sufficient personal questions correctly to establish his or her identity, the computer system can create a secure account for the requestor associated with the payment application executing on the requestor's mobile device. The requestor can now make monetary transactions, such as deposits or withdrawals, with the sender or any other sender that utilizes the disclosed technology.

In an example scenario, the requestor is present at a cash-only music concert but runs out of cash. The requestor makes a request for cash via the payment application. Not having any friends nearby, the requestor makes a request to his or her friend outside the geographical perimeter of the music concert. The friend being incapable of furnishing the request either forwards or causes the request to be forwarded to a third entity that is both available in proximity to the first party or requestor and is also capable of providing the requested cash. The requestor makes the deposit of digital payment in the sender's account either directly or through the network of intermediate connections, including the second party, and their accounts. To determine the sender's account, the requestor can use a payment processing system to obtain identifying information from the sender's cell phone known to the intermediate participant from whom sender receives the request. The payment processing system can transmit this identifying information to the computer system, and the computer system can determine the financial account associated with the cell phone. The sender can accept a digital payment from the requestor using the payment processing system, as, after or before the sender has credited the requestor for the amount of the deposit.

Brief definitions of terms, abbreviations, and phrases used throughout this application are given below. The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another.

In cases where the participant neither has an existing service account associated with the payment application nor had any previous transactions associated with the payment application, the sender can still send money to the requestor through the disclosed technology. The disclosed technology enables a requestor to send money to one or more requestors without knowing whether the one or more senders have existing service accounts associated with the payment application. The disclosed technology can perform the payment process by transmitting a linking invitation requesting the sender to either submit financial account information or to create a new service account associated with the payment application (e.g., account creation process generally involves submitting financial account information).

In addition, the disclosed technology does not require a requestor to have an existing service account associated with the payment application. As long as a requestor or the intermediate party has the payment application properly installed in his/her mobile device, the sender can easily send physical money to intended requestors by the payment processes discussed herein in lieu of digital payment.

The disclosed technology provides an easy way for requestors having a payment application to send digital payment in lieu of physical cash by (1) entering an amount to be sent (2) selecting a SEND button (e.g., provided by a user interface) for a sender; (3) receiving information of a potential sender willing to offer physical cash; (4) obtaining physical cash from the sender; (5) sending the digital payment of the entered amount to the sender's financial account. The disclosed technology requires neither a sender nor a requestor to have an existing service account associated with the payment application. The disclosed technology provides the same user experience (e.g., a user interface remains similar or identical) to those who do not have existing service accounts associated with a payment application as those who do. Not having an existing service account does not prevent a user from utilizing the payment application and/or initiating a payment process.

In some embodiments, the disclosed technology enables a payment application to send an invitation (e.g., an email, a Short Message Service (SMS) message, or a Multimedia Message Service (MMS) message) to those involved in payment transactions associated with the payment application (e.g., either a sender or one or more requestors, referred to as the "invitees" below). The invitation can include a hyperlink requesting the invitees to link up (e.g., associate) their financial account information (e.g., a back account number, a credit card number, and/or a debit card number) with the payment application.

In some embodiments, the invitation can include a link to a secure location where the invitees can link up their financial account information with the payment application. In some embodiments, the invitees can provide their financial account information by simply replying to the invitation. For example, an invitee can simply enter his debit card numbers in a text message in response to a text message invitation. In another example, an invitee can simply put his or her account number in an email in response to an email invitation. In some embodiments, an invitation can include a token (e.g., an embedded security token) that can verify that the information received from an invitee is actually from a valid email address (or was linked from a valid email address) or a valid phone number.

The disclosed technology also provides a method for facilitating payment sharing through implementation of a payment application. The method allows a user of a client computing device (e.g., a smartphone), such as a sender, to send money to multiple requestors in a convenient way, or for a requestor to request physical cash from multiple senders. More particularly, in response to a payment instruction from the user, the method can first retrieve a set of contact information (e.g., personal contacts including contact names, phone numbers, and/or email addresses) previously stored in a database of the client computing device. The method can then verify whether the contacts described in the retrieved contact information have existing service accounts in a server computing device (e.g., a web server that provides payment services or a PSS). For example, the method can verify whether the retrieved email addresses have been used as account names (e.g., login names) for creating new accounts in the server computing device.

In addition, the method can determine the number of potential requestors (e.g., payees) that are within the proximity of a client computing device. The method can analyze the retrieved contact information and obtain current locations of multiple electronic devices (e.g., smartphones) that correspond to the contacts from the retrieved contact information. For example, the retrieved contact information can include a phone number. The method can use that phone number to check or verify the current location of the electronic device having this particular phone number through, for example, a location service server (assuming that the phone number's owner authorized the location service server to disclose his or her current location). In other examples, the method can acquire location information based on a scanning process (e.g., by Bluetooth connection or other similar connections) that can determine whether the electronic devices that correspond to the retrieved contact information (e.g., potential requestors' smartphones) are within the proximity of the client computing device (e.g., sender's smartphone).

After collecting the account information and the location information, the method can generate an order for the contacts (or rank the contacts) in the retrieved contact information. The order can be used to determine how to provide (e.g., via a user interface shown on a display) the retrieved contact information to a user of the client computing device. For example, the method can first provide the contacts that seem to be in the proximity of the client computing device (e.g., the requestors and the user of the client computing device go to dinner together). In another example, the method can first provide those contacts that indicate an association with the payment application installed in the client computing device (e.g., the contacts having the same payment application installed).

In some embodiments, the method can first provide those contacts that seem to involve in a prior transaction with the user of the client computing device. Then the user, as a sender or payer, can quickly choose a proper requestor or payee from the provided information. In other examples, the method can first provide those contacts that seem to have existing accounts in a server computing device (e.g., a web server that provides payment services or a PSS) associated with the payment application previously installed in the user's client computing device. Then the user can quickly choose a proper requestor or payee and then pay the same.

The disclosed technology also provides a method of sending invitations for creating accounts in a server computing device (e.g., a web server that provides payment services or a PSS) from a client computing device (e.g., a user's smartphone). The method enables a user of the client computing device to input an invitation instruction. After receiving the invitation instruction, the method then retrieves a set of contact information from the client computing device. The method can then verify, for example, through communication with a server computing device, whether the retrieved contact information indicates that the user's contacts have existing service accounts in the server computing device (e.g., checking whether the retrieved email addresses in the retrieved contact information have been used to create new accounts in the server computing device). The method can generate a candidate list that includes the user's contacts that do not have existing accounts in the server computing device. The method can then enable the user to send an invitation (e.g., via email, Short Message Service (SMS), or Multimedia Message Service (MMS)) to the user's contacts in the candidate list, to ask them to create new accounts.

In some embodiments, the number of contacts that a single message can have can be limited to a predetermined or specified number (e.g., ten). The predetermined number can be determined based on availability of computing resources (e.g., connection bandwidth) or localities of the user and the invitation requestors (e.g., certain local regulations or rules may limit the number of requestors in one email).

The method also provides an incentive to a payment application user who offer physical cash in lieu of digital payment. The incentive can be based on factors, such as location, urgency of the request, time of the day (e.g. one-dollar cash or credit during off peak hours) or calculated based on a specific function (e.g., an exponential function). Advantages of the prevent technology include enabling the payment application user to promote the payment application for cash by configuring invitations on a per sender or requestor basis, rather than from a server associated with the payment application.

One aspect of the disclosed technology includes enabling a user who is using an instant message application (e.g., WhatsApp, Snapchat, Viber, Line, WeChat, etc.) or a communication application (e.g., an email application) to send money to another user who is also using the same application in lieu of physical cash. (Some of these messaging applications may be trademarks of their respective owners.) The disclosed technology enables a payment application to act as a backend or background process (e.g., a user would not notice or know that backend or background process during normal operation) associated with or incorporated in an instant message application, so as to provide the user with a "seamless" user experience (e.g., does not need to switch between the instant message application and the payment application; there is no interruption of an existing dialogue or chat). In some embodiments, a sematic analysis can be performed so as to determine whether a user really wants to request physical cash or digital cash. In some embodiments, further user authorization can be required (e.g., to confirm with a user whether he or she really wants to pay the other user and/or verify a specified amount to be paid).

For example, when user A is chatting with user B on an instant message application associated with a payment application (as a backend/background application), user A can specify that he or she wants user B to give a specified amount of money in physical cash (e.g., user A can say: "I would like you to give me $100 for dinner yesterday in cash," "please give me $10 in dollar bills"). Once a specified identifier (e.g., the dollar sign "$" or "cash" or "bills") is detected, the payment application can initiate a payment process as per present disclosure. In some embodiments, the specified identifier can be a character, a string, a symbol, an embedded code, an insignia, etc. The payment process can start by, for example, searching user A's contact list for user B's contact information. Once found, the payment process can then proceed by: (1) verifying whether user B has an existing service account with the payment application; or (2) verifying whether user B has a previous transaction associated with the payment application. If either of the two verifications has a positive outcome, the payment application can continue to determine whether user B has a cash account set up to offer physical cash and if user B is in proximity to the user A. If not, the network of user B is determined or proximate users around A are determined until a sender candidate is identified. The sender pays user A with cash in lieu of digital payment received from user A via user.

Various embodiments and implementations of the disclosed purchasing technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by participants. Actions attributed to a merchant may include actions performed by owners, employees, or other agents of the merchant and thus no distinction is made herein unless specifically discussed. In addition, as used herein, a participant may include any entity that acquires goods or services from a merchant, such as by purchasing, renting, leasing, borrowing, licensing, or the like. Hereinafter, goods and/or services offered by merchants may be referred to as items. Thus, a merchant and a participant may interact with each other to conduct a transaction in which the participant acquires an item from a merchant, and in return, the participant provides payment to the merchant, for example through a biometric payment instrument.

As used herein, a 'payment transaction' or simply 'transaction' may include a financial transaction for the acquisition of goods and/or services that is conducted between a participant and a merchant. For example, when paying for a transaction, the participant can provide the amount that is due to the merchant using a payment proxy. In other cases, the payment transaction includes transfer of money from one party to another for any number of reasons. Thus, while the description refers to as participant and merchant as parties to the payment transaction, it will be understood that the parties can be a sender and a requestor, a land lord and a renter, a bank and a bank participant, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the participant's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the participant or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

As used herein, Social networking website or network may be one or more websites and/or mobile device applications that allow a user to create an account and provide user-specific information, including interests, and network with other users based on social connections. Examples of social networking sites/applications may include, without limitation, Facebook, Snapchat, Instagram, Google+, LinkedIn, Twitter, Pinterest, and/or the like. Each user may have one or more accounts with associated account data. User account data may include, without limitation, contact information for the user's friends or associates on the social networking site, the user's gender, age, relationship status, family members, interests, hobbies, social groups that the user is a member of, entertainment preferences, political views, religious beliefs, favorite sports teams, and geographic location. The user's account data may be stored in a database.

Network may be one or more of a wireless network, a wired network or any combination of wireless network and wired network. For example, network may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal. Network 108 may comprise one or more secure communication channels for securely exchanging information between the various entities. In addition, network may include, without limitation, telephone lines, fiber optics, IEEE Ethernet 902.3, a wide area network ("WAN"), a local area network ("LAN"), or a global network such as the Internet. Also network may support an Internet network, a wireless communication network, a cellular network, or the like, or any combination thereof. Network may further include one network, or any number of the example types of networks mentioned above, operating as a stand-alone network or in cooperation with each other. Network may utilize one or more protocols of one or more network elements to which they are communicatively coupled. Network may translate to or from other protocols to one or more protocols of network devices. Although network depicted as a single network, it should be appreciated that according to one or more embodiments, network may comprise a plurality of interconnected networks, such as, for example, the Internet, a service provider's network, a cable television network, corporate networks, and home networks.

The term "landing page," as used here, refers to a virtual location identified by a personalized location address that is dedicated to collect payments on behalf of a requestor associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www. . . .com/$charityName. In another example, the URL is www. . . .com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment processing system to receive, e.g., collect, one or more payments on behalf of the requestor from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment processing system detects the user's intent to send money, e.g., $10, to "$funnyguy311" and initiates the transfer of money upon identification of a requestor financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "registration application" or "mobile payment portal" as used here, refers to any messaging application that enables communication between users (e.g., sender and requestor of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment processing system for processing. The payment processing system identifies a requestor associated with the input (or payment proxy) that is derived from the TO field, and further identifies a requestor financial account associated with that requestor. Upon identification of the requestor financial account, the payment processing system initiates the transfer of money.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "component" refers broadly to software stored on non-transitory storage medium (e.g., volatile or non-volatile memory for a computing device), hardware, or firmware (or any combination thereof) components. Components are typically functional components that can generate useful data or other output using specified input(s). A component may or may not be self-contained. An application program (also called an "application") may include one or more components, or a component can include one or more application programs.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1A is a diagram illustrating components of or associated with a first embodiment of a system 100 to enable a requestor to perform monetary transactions, such as request physical cash through payment application, as per a two-party, three-party, or a multi-party architecture. FIG. 1A includes requestor devices 102A connected to requestor 102 and sender devices 104A connected to senders. Also, "requestors" may be referred to as cash recipients, and "senders" may be referred to as cash providers. A "requestor" may be an individual that operates a requestor device 102A and "sender" may be an individual that operates the sender device 104A during a particular transaction. A "requestor" device 102A therefore be associated with a device user that is seeking cash. Similarly, the sender device 104A is associated with a device user that is providing cash. Each of the devices may be running an instance of a payment application that facilitates interaction and exchange of financial information between the sender and the requestor. In one implementation, the sender and the requestor's devices are connected via network 114, that can be a communication network. The requestor and senders may be connected through, for example, various social networks as well through various degree of separation. In other implementations, the requestor and sender may not be connected to each other all through any social network.

The system 100 also includes a sender-requestor association component 110, which can be implemented on a computer system, such as a payment processing system (PPS) 108. PPS 108 can be computer system 700 of FIG. 7, and can be referred to as a payment server. Sender-requestor association component 110 can enable requestors to engage in financial transactions with senders either directly or indirectly for physical cash in lieu of digital or electronic payment, and enable senders to process the electronic payments associated with the financial transactions, and deposit funds from the electronic payments to financial accounts associated with the senders.

For example, a requestor 102 can purchase a good from a merchant that accepts cash as a form of payment. The requestor 102, via a payment application executing on the requestor device 102A, sends a request to a sender-requestor association component 110 via PPS 108. The sender-requestor association component 110 matches a sender with a requestor, as per an association model. The association model may be based on various factors such as, but not limited to, conditions set by the requestor and/or sender, the distance between the requestor and sender, the amount requested by the requestor, the cash balance of the sender (that is the amount the sender is willing to offer as set by the sender or as predicted based on transaction history of the sender), and the degree of separation between the sender and requestor (for example, the requestor or sender may only wish to interact with their social contacts or with known contacts), and the release timing indicating how fast a sender can release funds. The release timing may be immediate in some cases or the requestor may have to wait certain time to receive funds. In one implementation, the sender-requestor association component 110, based on the association model, determines a sender-requestor pair or pairs with whom the requestor can directly or indirectly (through a mesh of network contacts) request for physical cash in lieu of electronic payment.

In some embodiments, sender-requestor association component 110 can also receive, as part of the same request or a subsequent request or previous request, the payment card information of the requestor to process the electronic payment from the requestor 102 using the payment card utilizing financial system 112. Sender-requestor association component 110 can obtain the electronic payment funds from a financial account associated with the payment card of the requestor, and can transfer the electronic payment funds to a financial account associated with sender 104, prior to or contemporaneous to the time when physical cash is exchanged between the sender and the requestor and a confirmation has been received by both parties.

In one example, sender 104 associates a financial account in which the deposit from the requestor is automatically credited. The sender also allocates, via the payment application on the sender device 104A, an indication of physical cash that he/she holds and what percentage or amount of the physical funds is he/she willing to offer to requestors. The sender, via the sender device 104A, can also set conditions on who, when and where the sender wishes to make such transactions. Payment processing system 108 is configured to be used by sender 104 to sell the goods, and can communicate with sender-requestor association component 110.

Sender 104, using payment processing system 108, can also open an account, for example, at sender-requestor association component 110. If sender 104 does not have proper identification, sender 104 can use payment processing system 108 to arrange for an alternate method of identification. For example, sender 104 can use payment processing system 108 to indicate that sender 104 wants to open an account but does not have the proper identification. Payment processing system 108 can communicate with sender-requestor association component 110, and sender-requestor association component 110 can provide an alternative method of identifying sender 104.

As one example of an alternative method of identifying sender 104, sender-requestor association component 110 can transmit personal questions to payment processing system 108 which sender 104 can answer to verify identity. The personal questions can include, for example, what was sender 104's residence address five years ago, and can list a number of possible answers to select from. As a second example, the personal questions can include what is sender 104's current outstanding phone bill balance and can list a number of possible answers to select from. After verifying sender 104's identity, sender 104 can create a financial account for sender 104 using payment processing system 108. For example, payment processing system 108 can transmit account creation information to sender-requestor association component 110, and sender-requestor association component 110 can create the financial account for sender 104. In a similar manner, financial accounts can also be sent for sender and all other parties, like intermediate parties, such as network contacts, shown as intermediate party 106 associated with intermediate device 106A. The network contacts may be provided by the requestor and as such the requestor may be given the option of selecting which contacts he would like to be included in the sender search. For example, the requestor may choose to only include "trusted contacts" in the search. The user may select other filters (e.g., "friends", "work associates", "family members"). Requestor may also indicate how far he or she is willing to travel to get cash (e.g., 0.25 miles, 1 mile, within a certain city or zip code, etc.). The mobile payment application may be provided with a "Get cash" and "Find nearby friends" or "Find friends willing to offer $10." When the requestor selects a particular contact or multiple contacts, the contacts receive a notification or a ping in real-time with which the intervening parties can interact to confirm whether the party wishes to help either by providing cash directly or through one or more senders.

Additional information can be linked to or associated with the financial account for various purposes. For example, for use as part of an identification verification process, or to facilitate locating the financial account. As a first example, the financial account can be linked to mobile devices, such as 102A, 104A, and so on. Payment processing system 108 can obtain identifying information from mobile device 102A, 104A, etc., and can transmit the identifying information to sender-requestor association component 110. Sender-requestor association component 110 can have access to a storage device on PPS 108. The storage device can contain a mapping database and sender-requestor association component 110 can use the mapping database to associate or link the identifying information with the financial account.

As a second example, requestor 102 and/or sender 104 can enter a personal identification number (PIN), which can be linked to the financial account. Sender 104 can enter a PIN, for example using payment processing system 108 or mobile device 190, and the PIN can be transmitted to sender-requestor association component 110. Sender-requestor association component 110 can use the mapping database to associate or link the PIN with sender 104's financial account. As a third example, a photo of sender 104 can be linked to the financial account. A photo of sender 104 can be taken, for example by payment processing system 108 or mobile device 190, and the photo can be transmitted to sender-requestor association component 110. Sender-requestor association component 110 can use the mapping database to associate or link the photo with sender 104's financial account.

Once sender 104's financial account is created, requestor 102 and/or sender 104 can perform monetary transactions, such as a making a deposit or a withdrawal, utilizing the financial account. To make a deposit, sender 104 can provide deposit money 185 to requestor 102, which requestor 102 can return in the form of electronic payment. It will be understood that in some implementations, the requestor 102 does not need to have financial account or even an association with the payment processing system 108 as long as another entity, such as the intermediate party 106, is willing to interact with the sender 104 on behalf of the requestor 102. In this case, the intermediate party 106 generates a request, creates an account, and deposits the requested fund, e.g., through a payment application on the intermediate device 106A as though the requestor 102 was generating the request.

In some embodiments, the identity of requestor 102 or sender 104 or even the intermediate party (collectively hereinafter referred to as participant) can be verified as part of making a monetary transaction, such as a deposit or a withdrawal. In some embodiments, to verify the identity of participant, participant can enter a PIN using, for example, payment processing system 108 or an associated mobile device. Payment processing system 108 can obtain identifying information from associated mobile device, and can transmit the identifying information and the PIN to sender-requestor association component 110. Sender-requestor association component 110 can execute a database operation using the mapping database to obtain account information including the PIN for the financial account associated with the identifying information. In some embodiments, validation of the PIN completes the verification of the identity of participant.

In some embodiments, the PPS 108 can use a photo to verify the identity of participant. Payment processing system 108 can obtain identifying information from mobile device, and can transmit the identifying information to sender-requestor association component 110. Sender-requestor association component 110 can execute a database operation using the mapping database to obtain account information including a photo for the financial account associated with the identifying information. Sender-requestor association component 110 can transmit the photo to payment processing system 108, and sender 104 can use the photo to validate the identity of requestor 102 before entering into the transaction and vice versa. In some embodiments, identity validation using the photo completes the verification of the identity of participant. In other embodiments, both validation using the PIN and validation using the photo are needed to complete the verification of the identity of participant. A person having ordinary skill in the art will appreciate that many other methods of verifying the identity of sender 104 exist and can be used. In some implementations, the identification methods are also used at the time of payment transaction, e.g., for security reasons to ensure that the transaction is not happening with a wrong or fraudulent participant and also to provide the participants a way to locate each other. Besides photograph and device identification, the PPS 108 can also, after receiving authorization from both parties, exchange communication identifiers, such as email addresses, phone numbers, and the like.

Continuing with sender 104's deposit, sender 104 can obtain identifying information of the requestor 102 from mobile device 104A using payment processing system 108. Payment processing system 108 can transmit the amount of requestor 102's deposit to sender-requestor association component 110 and finally to the sender's account, while based on the identifying information, the sender 102 physically exchanges the requested amount to the requestor 102. PPS 108 can include a storage device containing a mapping database that associates the identifying information with the financial account, and sender-requestor association component 110 can access the mapping database. Sender-requestor association component 110 can execute a database operation using the mapping database to obtain account information for the financial account associated with the identifying information. Having the account information for sender 104's financial account, sender-requestor association component 110 can credit the financial account for the amount of sender 104's deposit, less a transaction fee. In some embodiments, the transaction fee can be zero.

To make a withdrawal, requestor 102 makes a withdrawal request for a specified amount of money referred to as requested amount (i.e., the amount of requestor's withdrawal request). For a withdrawal, the identity of requestor 102 may need to be verified. The identity of requestor 102 can be verified using a process, such as one of the previously described identity verification processes. Payment processing system 108 can obtain identifying information from mobile device 102A for both identification and for obtaining an electronic payment. The sender-requestor association component 110 enables a person-to-person cash dispenser and dispenses physical cash to other individuals in exchange for digital payment by mapping a sender that can offer cash with a requestor that can provide electronic payment in lieu of physical cash.

The sender-requestor association component 110 then determines based on an association model the sender that is wiling to offer cash to the requestor. Accordingly, the sender-requestor association component 110 pairs the requestor and sender and Payment processing system 108 can transmit the amount of requestor's withdrawal request to the sender's account. Sender-requestor association component 110 can execute a database operation using the mapping database to obtain account information, including an account balance, for the financial account associated with the sender's account.

When the account balance is sufficient to fund requestor's withdrawal request, sender-requestor association component 110 can transmit a confirmation message to payment processing system 108. Sender-requestor association component 110 can credit requestor's financial account for the amount of the withdrawal. In some embodiments, requestor's financial account is debited for a transaction fee. Sender-requestor association component 110 can determine the sender 104's financial account by executing a database operation using the mapping database to obtain account information for the financial account associated with payment processing system 108. When requestor's withdrawal is successful, sender-requestor association component 110 can credit sender 104's financial account for the amount of the requestor's cash deposit plus a transaction fee. In some embodiments, the second transaction fee can be zero.

Figure 1B:
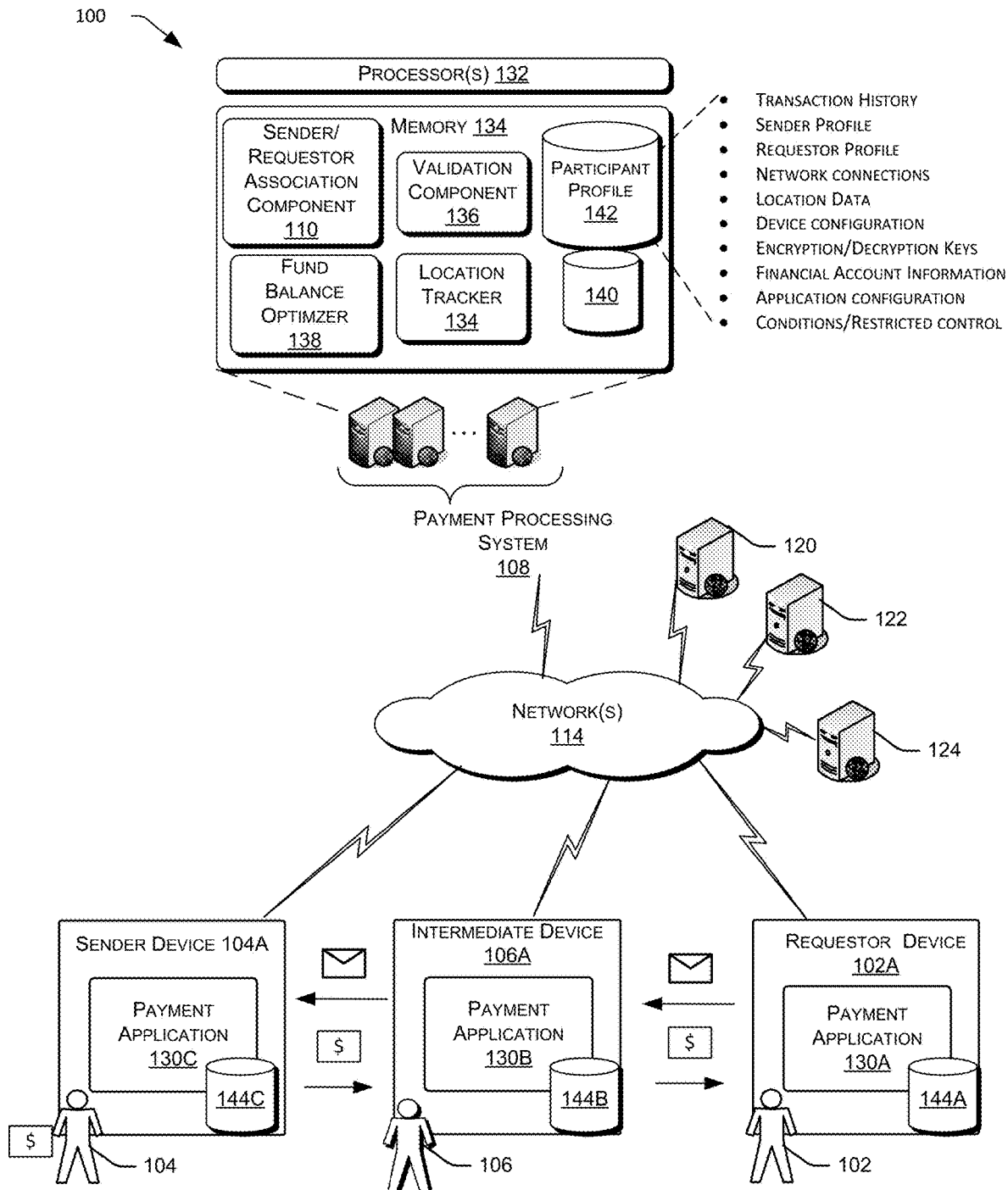
FIG. 1B is a diagram illustrating the network diagram showing flow of funds for a cash transaction between a sender and a requestor.

FIG. 1B is a network diagram illustrating the various components and the flow of funds for a cash deposit made by a sender to a requestor through the payment processing system. The following description of FIG. 1B will be described using the system illustrated in FIG. 1A, and will refer to labels of that figure. This is a non-limiting example and is done with the intent of making the description of FIG. 1B easier to understand.

In one implementation, FIG. 1B is a network environment 100 that illustrates various devices (102A, 104A, 106A) executing payment application 130A, 130B and 130C thereon, which may be operated by requestor 102, sender 104, and intermediate party 106 (collectively referred to as participant). In one implementation, the requestor 102 initiates communication with a sender 104 or any intermediate party, which can be a contact of the requestor 102, to provide cash. The request can be made through a mobile payment application 130A executing on the communication device 102A, or by contacting the intermediate party 106 or sender 104 by phone, electronic mail or other means of communication.

The devices are communicatively coupled to the PPS 108. Some of the advantages of these associations are that data can be stored remotely on the PPS 108, especially sensitive payment data. Furthermore, the remote server can provide scalability, failover management, centralized and automated backup services, and faster access to data.

The device (102A, 104A, 106A, and so on) can be a mobile device or a desktop device. Mobile devices include smart phones, tablet computers, laptops, mobile wearable devices like Apple® watch or a Fitbit®, or other mobile data processing apparatus. Additionally, or optionally, the device may also include a sensor, such as a camera, or antenna or transmitter/receiver, GPS unit, to receive and process environment characteristics, for example, location of the device, and the like. The device then saves such environment characteristics either locally within database instances 144A, 144B, 144C, etc., or sends to the payment processing system 108, which then connects the data to a participant's identity. The device 107 also has characteristics that can be tracked, detected and monitored either through another application on the device or by engagement with a button, such as a start button and the like. The device characteristics include registration number associated with the device, the type of signals emitted by the device, whether communication ports are enabled, whether Bluetooth is enabled, and so on.

The devices also include a network interface to allow communication with other devices using a variety of communication protocols. For example, multiple network interfaces may be employed to allow for the communication over broadcast, multicast, and/or unicast networks 114. Through a communications network 114, the device is accessible through remote clients (e.g., computers with web browsers). Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the device.

In various embodiments, the network interface may also support wireless data transfers between the device and external sources, such as clients and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s).

The devices may also comprise any sort of mobile or non-mobile device that includes an instance of a payment application 130 (such as 130A, 130B, 130C, and so on) that executes on the respective device. In some instances, the payment application 130 can execute on a device separate from the primary device, for example another communication device associated with the participant. The payment application 130 may provide POS functionality to the device to enable the participant (e.g., a buyer, an individual user, etc.) to accept and send payments after registering or otherwise associating assigned payment instruments (such as payment objects and/or communication devices). The device can include a display for displaying notifications, visual cues, and interactive fields to interact with the PPS 108 via the payment application 130.

The interactive fields can also be accessible via the payment application 130 to allow the requestor to send a request for physical cash. For example, the interactive fields, when selected or pressed or otherwise engaged, can generate a set of instructions for the requestor 102 to follow to make such request and apply conditions on the request. For example, one of the instructions define the manner in which the requestor 102 should first send money to be able to receive physical cash. In some examples, the requestor 102 may also have to provide security or identification to better assist in mapping the requestor with a sender. The request can be broadcasted or targeted to a specific set of senders, or a specific set of contacts of the requestor, or a specific individual selected by the requestor. Once a sender is selected, the communication between the sender and the requestor can be in the form of text, electronic mail, phone call, or any other kind of notification to enable exchange of physical cash. In other cases, the sender and requestor may continue to interact via the PPS and the sender may provide a drop off location or address to leave the physical cash. The payment application 130 too, has application characteristics or profiles associated thereto. The payment application characteristics and profiles, include for example, application version history, status of APIs or handlers executing on the application, error log, transaction log, and so on. The states of the payment application 130 can also be sent to the PPS 108 from time to time.

The term "payment application" or "mobile payment portal" as used here, refers to any registration application that enables communication between users (e.g., sender and recipient of a message) over a wired or wireless communications network. The registration application can be employed by a service provider that delivers a communication service to users, e.g., chat capability or capability to request participant support through ticket creation The registration application may include one or more components and/or engines, or a component and/or engine can include one or more applications. The registration application can include, for example, a mobile payment application, a text messaging application for communication between phones (e.g., conventional mobile telephones or smartphones), or a cross-platform instant messaging application for smartphones and phones that use the Internet for communication. The registration application can also include, for example, a web browser application installed on the device, such as device 102A, accessible via a uniform resource locator (URL). In some embodiments, the URL is identified by a graphical user interface (GUI) of a mobile payment application installed on the device.

In one implementation, the payment application, at least in part, converts the device into an electronic point-of-sale system with the capability of associating a variety of payment instruments, such as credit cards, debit card, gift cards, near-field communication (NFC) based payment instruments, and the like, to the payment application, and thus, the device. The association between the payment instruments can be stored locally in the device in database 144 (such as database 144A, 144B, etc.) or at the PPS 108. The PPS 108 can work in both online and offline modes to allow the requestor to both access physical cash whether or not the communication network between the PPS 108 is established or not. In offline mode, the network 114 between the sender 104 and requestor 102 is local area network, or short range network where data related to potential senders, and fund availability can be saved at the last instance the sender and requestor were online.

In some types of businesses, the sender 104 may correspond to any individual with access to physical cash or funds. In another implementation, the sender 104 may correspond to a store or other place of business of the merchant, and thus, may be a fixed location that typically does not change on a day-to-day basis. In other types of businesses, however, the sender 104 may change physical location from time to time, such as in the case that the merchant operates a food truck, is a street vendor, a cab driver, etc., or has an otherwise mobile business, e.g., in the case of merchants who sell items at buyer's homes, places of business, and so forth. In the figure, the PPS or the device is shown to include certain components. The components may be distributed between the device and the payment processing system 108. The payment processing system 108 may have limited memory and may only receive cached data when analyzing but otherwise the cached data and components may be stored in the device.

In one implementation, the PPS 108 includes one or more components configured specifically to allow the PPS 108 to map a sender with a requestor and process payment transaction with electronic transaction in one direction and cash transaction in the other direction.

The components of the PPS 108 include, for example, a processor 132, a memory (not shown) having components such as sender requester application component 110, a fund balance optimizer 138, a validation component 136, a location tracker 134, a participant data-structure within a database 140. The participant data structure includes tables related to data of the requestor, sender, and other intervening parties, including transaction history, interaction of the participant with the devices, including PPS, the participant account history, the device configuration, the encryption/decryption keys, payload or detection sequences, the payment instrument history, error logs, mobile payment application configuration, participant location history, device location or states, financial account information, network connections, such as social contacts and phone contacts, application configuration, any conditions or restricted controls to be applied to the participant's account and so on.

The sender requestor association component 110 includes instructions to associate a sender with a requestor based on an association model. The association model may take into consideration various factors such as location of the sender/requestor, the amount of cash with the sender, the transaction history of the sender to predict how much cash they may have, the sender's preferences that define who they want to offer cash to, requestor's preferences to indicate who they want to receive the cash from, the time of transaction, and so on. Based on the association model, the component 110 matches a sender with requestor or multiple senders with multiple requestors. Thus the relationship can be one to many, many to many, one to one or many to one. In some cases, the component 110 connects one requestor to multiple senders such that the requestor receives physical cash from several senders. The opposite is also possible.

The validation component 110 includes instructions to validate a request and identifying information of the requestor and the sender.

The location tracker 134 includes instructions to track the location of the requestor and the sender to enable proximate payments. That is, in instances where the user has allowed the sharing of the geo-location of the user's device with the entity (e.g., payment service), the PPS 108 can determine which senders are closest to the requestor or are willing to travel to the requestor. The PPS proceeds to detecting location of the devices of the requestor or sender through location detection techniques, such as techniques based on triangulation, trilateration, multi-laterations, geo-fence, global or local positioning systems, and the like.

The fund balance optimizer 110 includes instructions to determine the giving capacity of a sender based on transaction history or as set in the payment application. The PPS may track the ATM history or cashback history to predict how much physical cash the sender is likely to have.

The PPS 108 can analyze the fund transfer request based on a plurality of rules stored in a knowledge database (not shown) before sending the fund transfer request to a computer system 120 of the PPS' acquirer or merchant's acquirer (hereinafter "acquirer 120"). For example, one of the rules in the knowledge base may be determining whether the request was authorized based on device fingerprinting as authentication in the offline mode. In one implementation, the acquirer 120 is a bank or financial institution that processes payments (e.g., credit or debit card payments) and may assume risk on behalf of a requestor or a plurality of requestor aggregated by and represented under PPS 108. The acquirer 120 sends the fund transfer request to the computer system 122 of a card payment network (e.g., Visa, MasterCard, Discover or American Express) (hereinafter "card payment network 122") to determine whether the transaction is authorized or deficient in any other way. In some implementations, PPS 108 may serve as an acquirer and connect directly with the card payment network 122. The card payment network 122 forwards the data to the computer system of an issuing bank 124. The issuer 124 is a bank or financial institution that offered a financial account (e.g., credit or debit card account) to the requestor. The issuer makes a determination as to whether the requestor has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 114, including the Internet, intranet, a cellular network, a local area network, a wide area network, or any other such network, or combination thereof. Protocols and components for communicating over such a network are well known and are not discussed herein. Furthermore, PPS 104, and the devices 102A, 104A, and 106A, communicate over the communications network 114 using wired or wireless connections, and combinations thereof. The payment transaction is either approved or rejected by the issuer 124 and/or the card payment network 122, a payment authorization message is communicated from the issuer to the computing device 102A or 104A via a path opposite of that described above.

Figure 2:
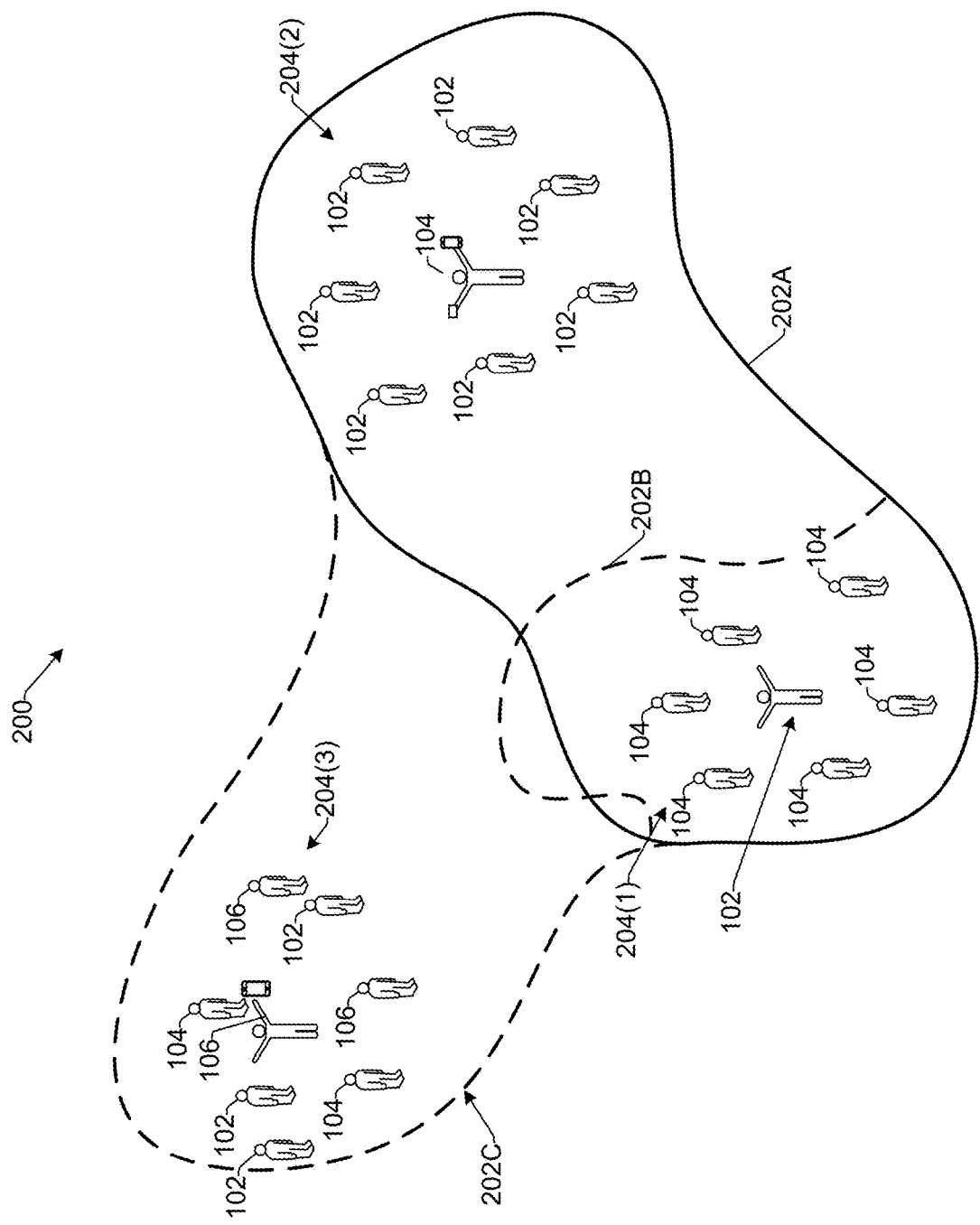
FIG. 2 is an example of determining fluid transaction zones corresponding to a sender and requestor relationship, according to some implementations.

FIG. 2 illustrates an example of determining fluid transaction zones corresponding to the requestor's location of transaction and based on the sender-requestor association component, according to some implementations. The service region is shown by arrow 200 and three zones 202A, 202B and 202C are now explained.

In one example as shown by 204(2), several requestors 102 may be surrounded by a single sender 104. Based on relative location factor and proximity, the PPS 108 may pair all requestors to the single sender 104 assuming sender 104 has the ability and willingness to furnish all requests. In cases where the sender 104 does not have the ability or willingness to offer cash to all requestors 102, the PPS 108 may generate a new boundary of service by incentivizing or otherwise approaching a pool of senders shown in the 202B boundary. Alternatively, since there is only one requestor 102 in the 202B boundary and the number of senders 104 far exceeds the requestors 102, in some implementations, the requestors from the 204(2) may be incentivized to travel to the boundary 202B or new requestors may be incentivized to request cash in the 202B boundary. Thus the new transaction zone may be 202A which includes the pool of requestors from 204(2) and pool of senders from 204(1). These cases are two-party cases where the requestor 102 and sender interact directly with each other. However, there may be cases where the sender and requestor do not know each other or the requestor may not have a communication device to reach out to a sender. In such cases, one or several intermediate parties can intervene and submit a request on behalf of the requestor. The intermediate parties can also deposit an electronic payment to the sender on behalf of the requestor. This step may occur after the requestor has received cash or contemporaneous to it. In some cases, this step is automatically performed as an indication of the exchange occurs as indicated by a wearable device, for example by means of a handshake or hi-five detected by the wearable device. In another implementation, the exchange can be assumed to happen when the sender device and the requestor's device are within a certain distance from each other. This kind of boundary is shown in 204(3) where an intermediate party is in proximity to both senders 104 and requestors 102, and also other intermediate parties 106. Assume a case in which the requestor 102 contacts the intermediate party 106 for physical cash. The intermediate party 106 (which can in one instance be a sender 104) is unable to furnish the request but forwards the request to the PPS 108 to find a sender for example in boundary 202C. The PPS 108 maps the intermediate party 106 either directly to the sender 104 or through a mesh of other parties 106. In some implementations, the requestor 102 may receive amount from several senders if one sender is not able to furnish the entire request himself or herself.

The transaction zones are determined based on the transaction location of the requestor and/or a transaction time interval and other such conditions, however in other cases, sender location or conditions may be used. For example, in some cases, the PPS may record an increase in demand for physical cash from location or region and/or time of day, such as during lunchtime on a normal workday. In such cases, PPS 108 may incentivize senders or requestors to move in a new transaction zone. The transaction zones may be fluid and dynamic in nature and change dynamically based on the movement of senders and requestors. In some cases, the zone determination may use clustering techniques, such as based on the frequency and density of the requestor or senders to determine a new area 202C to add to the original transaction region 202A. For instance, a centroid may be determined for the cluster, and the third location may be selected based at least in part on the cluster centroid. Further, as mentioned above, in some examples the expansion of the transaction region 202C may be for certain times of day, for certain days of the week, and for certain types of requests.

The boundaries in this example are shown to be fluid and not conforming to a particular shape or form, however, defined and fixed boundaries may be drawn such that instead of a specific requestor or requestor region, a number of new requestors are included in the new transaction zone of a specific sender based at least on the association model.

Figure 3:
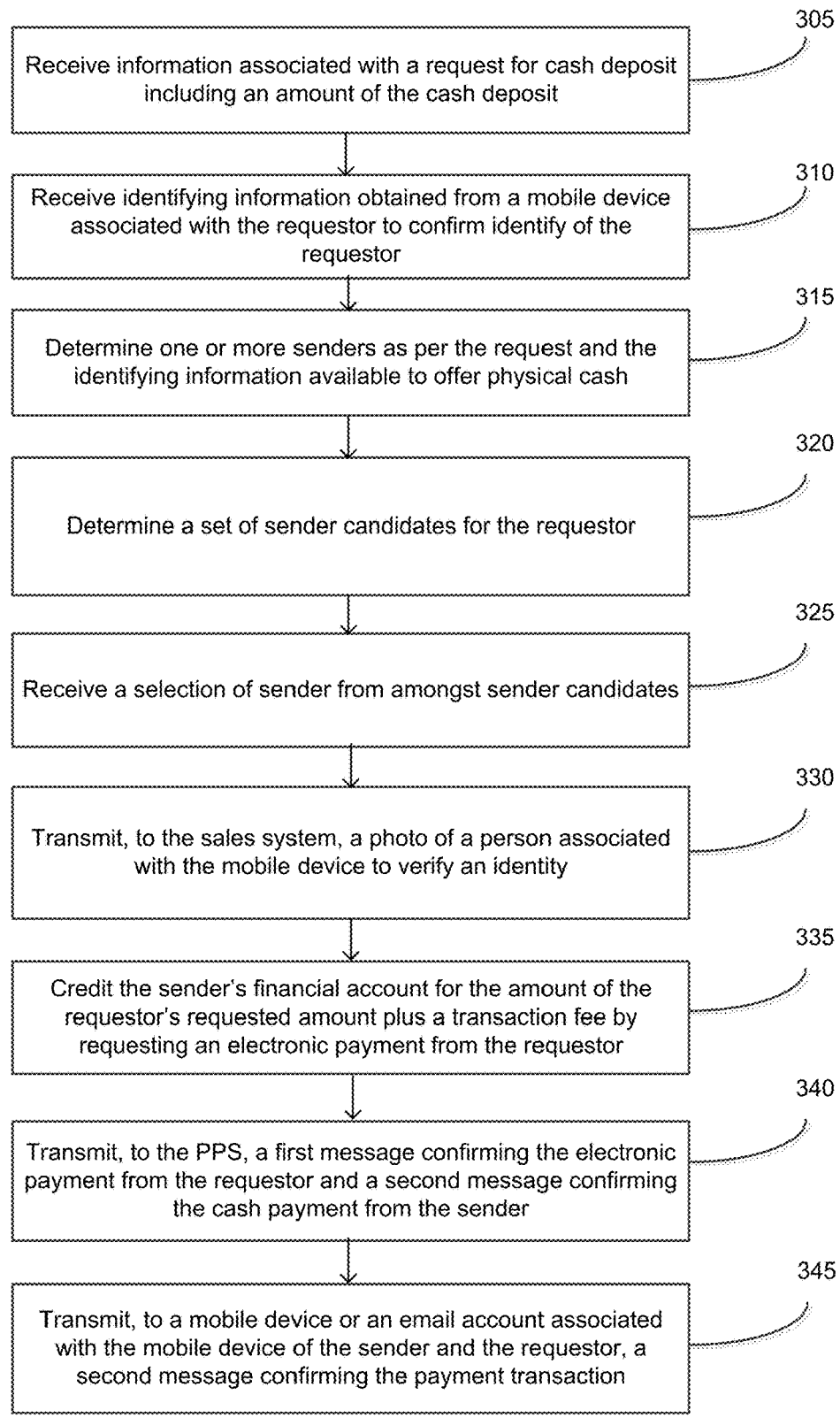
FIG. 3 is a diagram illustrating components of or associated with an embodiment of a system to enable a sender to perform monetary transactions in a two-party scenario.

FIG. 3 is a flow chart illustrating operations of a method for a requestor to make a cash deposit. The following description of FIG. 3 will be described using the system illustrated in FIGS. 1A and 1B, and will refer to labels of that figure. This is a non-limiting example and is done with the intent of making the description of FIG. 3 easier to understand. Note that, in some embodiments, including the embodiment of FIG. 1A, all steps of the method of FIG. 3 can be carried out by PPS 108 as well as sender-requestor association component 110. In some embodiments, some or all transaction fees associated with the steps of FIG. 3 are zero.

Step 305 includes receiving information associated with the request for cash deposit including an amount of the cash deposit. The cash deposit can be the requestor's requested amount. Step 305 can include PPS 108 and/or sender-requestor association component 110 receiving, from an application associated with the requestor's device, information associated with a cash deposit including an amount of requestor's cash deposit.

Step 310 includes receiving identifying information obtained from a mobile device associated with a requestor. The identifying information can be sent by the payment processing system and the mobile device can be the requestor's mobile device. Step 310 can occur before or after step 305. Using the example of FIG. 1B, PPS can obtain identifying information from mobile device 102A using payment processing system 108. Payment processing system 108 can transmit the identifying information to validation component. Step 310 can include PPS 108 receiving, from requestor device 102A identifying information obtained from mobile device 102A, which is associated with requestor 102A.

Step 315 includes determining the one or more senders to pair with the requestor for furnishing the requestor's request. The PPS 108 can include a storage device containing a mapping database that associates the request and identifying information with the requestor's financial account, and pairs the requestor to one or more senders willing to offer cash.

Step 320 includes determining which amongst the sender is a good candidate for the requestor. For example, based on conditions levied by the requestor and/or sender, such as location preference, etc., the sender is paired with the requestor in increasing or decreasing order of preference. Each of the sender identities may their photo for easy identification and similarly the requestor identities may also be sent to the sender.

At 325, a requestor or sender relationship is set, for example, by a requestor selecting a sender or by sender initiating or confirming connection. Once the relationship is set, e.g., temporarily for a defined period of time, the requestor can reach out to the sender and obtain physical cash.

At 335, the sender's account is credited with an amount of the requestor's cash deposit plus a transaction fee. The financial account information may be connected to the sender payment application within the PPS 108.

Step 340 includes transmitting, to the payment processing system, a first message confirming the cash deposit. Step 345 includes transmitting, to a mobile device and/or an email account associated with the mobile device, a second message confirming the cash deposit.

FIG. 4 is a flow chart illustrating operations of a method for creating a financial account. The following description of FIG. 4 will be described using the system illustrated in FIG. 1B and will refer to labels of that figure. This is a non-limiting example and is done with the intent of making the description of FIG. 4 easier to understand. Note that, in some embodiments, including the embodiment of FIG. 1B, all steps of the method of FIG. 4 can be carried out by PPS 108 and/or sender-requestor association component 110. The examples here use sender or requestor as a participant, however either or both can be part of this method.

Step 405 includes receiving identity information for a requestor or sender (participant). Sender 104 can open a financial account. Sender 104, using payment processing system 108, begins the process of opening a financial account for sender 104. Sender 104 provides identity information, which can be entered into PPS 108 and transmitted to PPS 108 and/or sender-requestor association component 110. PPS 108 and/or sender-requestor association component 110 receives identity information for sender 104.

In some embodiments, sender 104 can use a computer system, such as a mobile device or a personal computer, to create a financial account. The computer system can access a website associated with PPS 108 and/or sender-requestor association component 110, or the computer system can run application software. Sender 104 can use the website or the application software to create a financial account. Sender 104 provides identity information to the website or to the application software, and the website or the application software causes the identity information to be transmitted to PPS 108 and/or sender-requestor association component 110. PPS 108 and/or sender-requestor association component 110 receives identity information for sender 104.

Step 410 includes verifying the identity of the requestor. Step 410 can occur in response to step 405. In some embodiments, step 410 can comprise the method of FIG. 5. Using the example of FIG. 3, in some embodiments, sender 104 has identification which meets the identification requirements. Sender 104 can have, for example, government issued identification, such as a state issued driver's license or identification card, or a federal government issued passport. PPS 108 can obtain identity information for sender 104. For example, PPS 108 can obtain identity information, such as a driver's license number and an address, from a state issued driver's license. PPS 108 can transmit the identity information to PPS 108 and/or sender-requestor association component 110, and PPS 108 and/or sender-requestor association component 110 can use the identity information to verify the identity of sender 104.

In some embodiments, sender 104 can use a website or application software to create a financial account. When sender 104 has identification which meets the identification requirements, the website or the application software can obtain identity information for sender 104 from the identification. The website or application can cause the identity information to be transmitted to PPS 108 and/or sender-requestor association component 110. PPS 108 and/or sender-requestor association component 110 can use this identity information to verify the identity of sender 104.

In some embodiments, payment processing system 110 can arrange for an alternate method of identification. For example, PPS 108 can communicate with PPS 108 and/or sender-requestor association component 110, and PPS 108 and/or sender-requestor association component 110 can provide an alternative method of identifying sender 104.

As one example of an alternative method of identifying sender 104, PPS 108 and/or sender-requestor association component 110 can obtain personal information from personal information databases, such as from the databases of credit report agencies such as Experian, Equifax, and TransUnion. PPS 108 and/or sender-requestor association component 110 can transmit personal questions based on the personal information to payment processing system 108 which sender 104 can answer to verify identity. The personal questions can include, for example, what was sender 104's residence address five years ago and can list a number of possible answers to select from. As a second example, the personal questions can include what is sender 104's current outstanding phone bill balance and can list a number of possible answers to select from. PPS 108 and/or sender-requestor association component 110 can verify the identity of sender 104 by comparing sender 104's personal question responses, received by PPS 108 and/or sender-requestor association component 110 from PPS 108, to the personal information obtained from the personal information databases. In some embodiments, when identifying object 390 is a mobile device, PPS 108 and/or sender-requestor association component 110 can transmit the personal questions to the mobile device, and can receive the personal question responses from the mobile device.

In some embodiments, sender 104 can use a website or application software to create a financial account. The website or the application software can arrange for an alternative method of verifying the identity of sender 104, such as the alternative method discussed above. Instead of transmitting the questions to PPS 108, in some of these embodiments, PPS 108 and/or sender-requestor association component 110 can transmit the questions to sender 104 via the website or the application software. PPS 108 and/or sender-requestor association component 110 can verify the identity of sender 104 by comparing sender 104's personal question responses, caused to be transmitted to PPS 108 and/or sender-requestor association component 110 by the website or the application software, to the personal information obtained from the personal information databases.

Step 415 includes creating a financial account. Step 415 can occur in response to step 405 or step 410 or steps 405 and 410. Using the example of FIG. 3, PPS 108 can include a storage device containing a database of financial accounts. PPS 108 and/or sender-requestor association component 110 can create a financial account by making the appropriate changes to the database of financial accounts. A person of ordinary skill in the art will appreciated that there are many ways to create a financial account.

Step 420 includes associating the financial account with the sender or requestor. Step 420 can occur in response to step 415. Using the example of FIG. 3, PPS 108 can include a storage device containing a mapping database that associates the financial account with the requestor identity information. PPS 108 and/or sender-requestor association component 110 can use the mapping database to associate the financial account with the identity information for sender 104. A person of ordinary skill in the art will appreciate that there are many ways to associate the financial account with the identity information for sender 104.

Step 425 includes receiving identifying information for an identifying object. Step 425 can occur after step 415 or after step 420 or before any of or all of steps 405-420. Using the example of FIG. 2, in some embodiments, identifying device can be a mobile device. PPS 108 can obtain identifying information from the mobile device. PPS 108 can transmit the identifying information to PPS 108 and/or sender-requestor association component 110. PPS 108 and/or sender-requestor association component 110 can receive the identifying information for the mobile device.

In some embodiments, identifying device can be a biometrically identifiable object, such as a finger, a hand, an iris, a retina, or a face. Payment processing system 108 can obtain identifying information for the biometrically identifiable object, such as by using a biometric scanner that is part of payment processing system 108, and can transmit this identifying information to PPS 108 and/or sender-requestor association component 110. PPS 108 and/or sender-requestor association component 110 can receive the identifying information for the biometrically identifiable object.

In some embodiments, identifying device can be an object, such as a magnetic stripe card, a smart card, a proximity card, a re-programmable magnetic stripe card, a card containing a quick response (QR) code, a card containing a bar code, or a government issued identification card. Payment processing system 108 can obtain identifying information from these objects, for example by using a card reader or a scanner that is part of payment processing system 108, and can transmit this identifying information to PPS 108 and/or sender-requestor association component 110. PPS 108 and/or sender-requestor association component 110 can receive the identifying information for the object.

In some embodiments, identifying device can be a proxy card. Payment processing system 108 can obtain identifying information from the proxy card, for example by using a card reader or a scanner that is part of payment processing system 108, and can transmit this identifying information to PPS 108 and/or sender-requestor association component 110. PPS 108 and/or sender-requestor association component 110 can receive the identifying information for the proxy card.

Step 430 includes associating the identifying information for the identifying object with the financial account. Step 430 can occur in response to steps 425 and 415. Using the example of FIG. 1B, PPS 108 can include a storage device containing a mapping database that associates the identifying information for identifying objects with financial accounts. PPS 108 and/or sender-requestor association component 110 can execute a database operation using the mapping database to associate the identifying information for identifying object 390 with the financial account.

Step 435 includes receiving a passcode. Step 435 can occur before or after step 425 or step 430, and can occur after any of steps 405-420. Using the example of FIG. 1B, sender 104 can provide a passcode. In various embodiments, the passcode can be a personal identification number (PIN), or a password, or a pass phrase. The passcode can be comprised of numbers, can be comprised of numbers and letters, can be comprised of numbers, letters, and punctuation marks, or can be comprised of any characters. The passcode can also include spaces.

In some embodiments, the passcode can be entered using payment processing system 108, and payment processing system 108 can transmit the passcode to PPS 108 and/or sender-requestor association component 110, where PPS 108 and/or sender-requestor association component 110 receives the passcode. In some embodiments, when identifying device is a mobile device, the passcode can be entered using the mobile device. The mobile device can transmit the passcode to PPS 108 and/or sender-requestor association component 110, where PPS 108 and/or sender-requestor association component 110 receives the passcode. In some embodiments, the passcode can be entered via the website or the application software, and the website or the application software can cause the passcode to be transmitted to PPS 108 and/or sender-requestor association component 110, where PPS 108 and/or sender-requestor association component 110 receives the passcode.

Step 440 includes associating the passcode with the financial account. Step 440 can occur in response to step 435. Using the example of FIG. 1B, PPS 108 can include a storage device containing a mapping database that associates passcodes with financial accounts. PPS 108 and/or sender-requestor association component 110 can execute a database operation using the mapping database to associate the passcode with the financial account. A person of ordinary skill in the art will appreciate that there are many ways to associate the passcode with the financial account.

Step 445 includes receiving a photo. Step 445 can occur after steps 415 and 420, or can occur before or after any of steps 425-440. Using the example of FIG. 1B, in some embodiments, payment processing system 108 can obtain a photo of sender 104. PPS 108 can transmit the photo to PPS 108 and/or sender-requestor association component 110, where PPS 108 and/or sender-requestor association component 110 receives the photo. In some embodiments, when identifying device is a mobile device, the mobile device can obtain a photo of sender 104. The mobile device can transmit the photo to PPS 108 and/or sender-requestor association component 110, where PPS 108 and/or sender-requestor association component 110 receives the photo. In some embodiments, the web site or the application software can obtain a photo of sender 104. The website or the application software can cause the photo to be transmitted to PPS 108 and/or sender-requestor association component 110, where PPS 108 and/or sender-requestor association component 110 receives the photo.

Step 450 includes associating the photo with the financial account. Step 450 can occur in response to step 445. Using the example of FIG. 1B, PPS 108 can include a storage device containing a mapping database that associates photos with financial accounts. PPS 108 and/or sender-requestor association component 110 can execute a database operation using the mapping database to associate the photo with the financial account. A person of ordinary skill in the art will appreciate that there are many ways to associate a photo with a financial account.

Figure 4A:
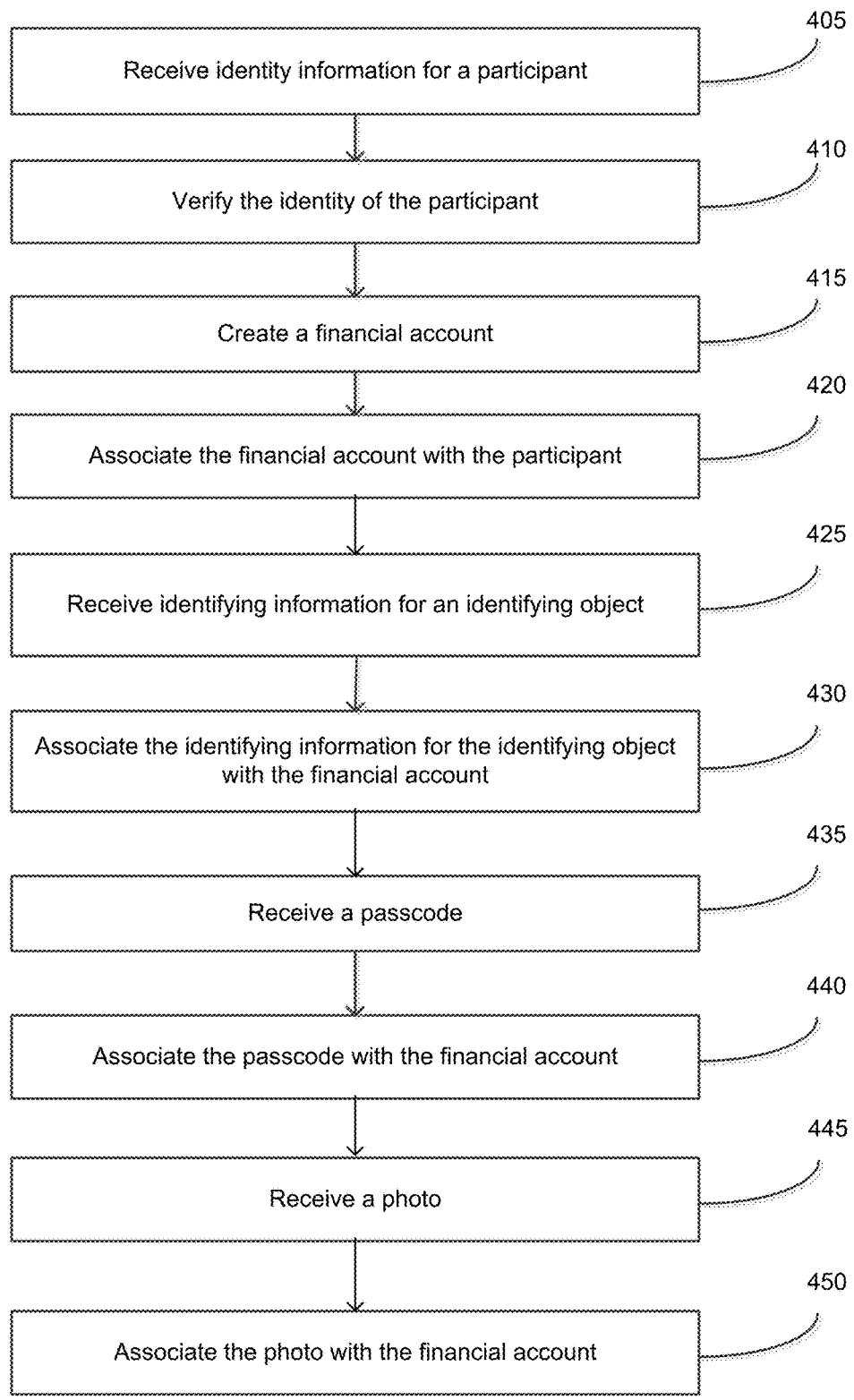
FIG. 4A is a flow chart illustrating operations of a method for creating a financial account and verifying the identity of a requestor or sender.
Figure 4B:
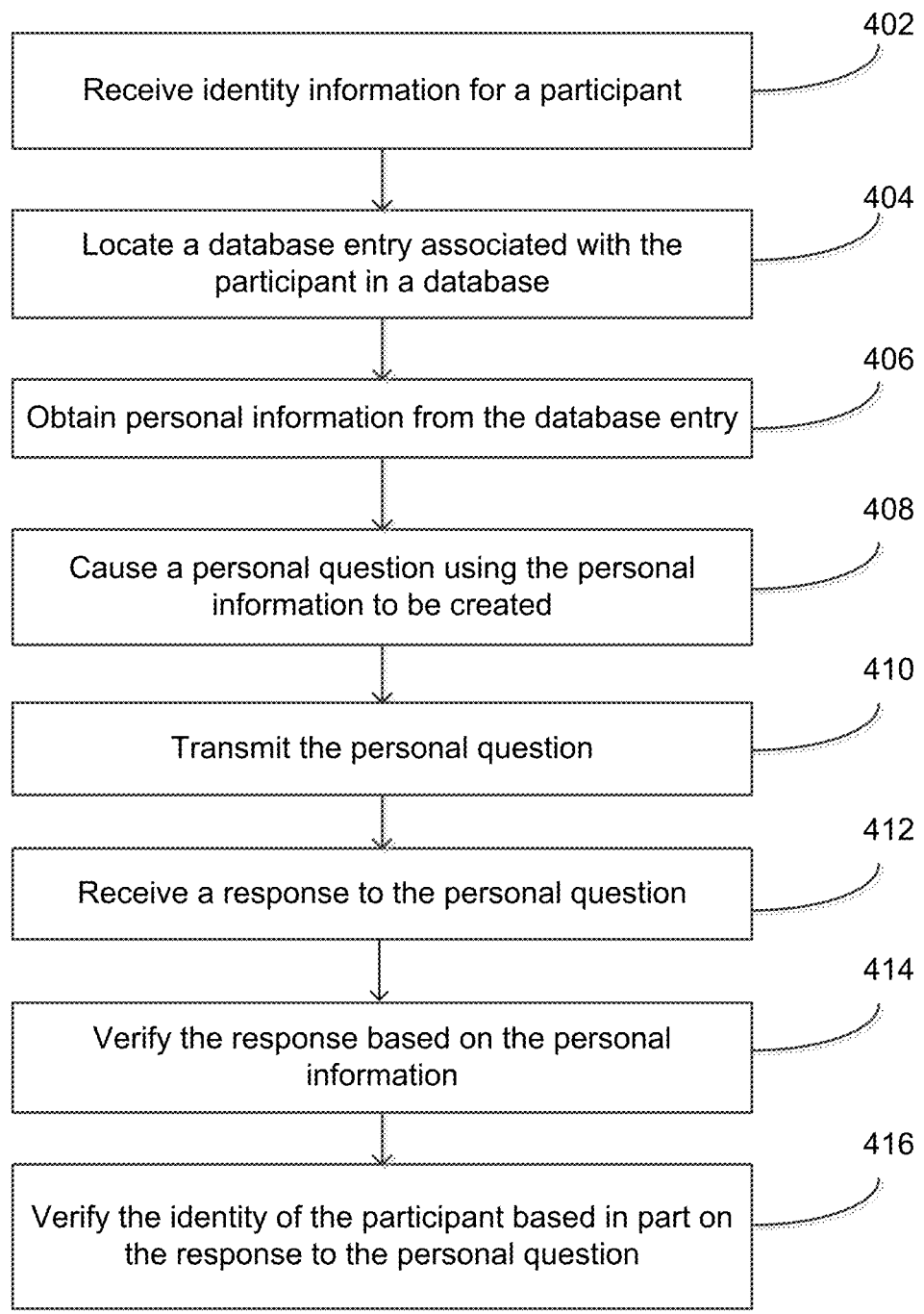
FIG. 4B is a flow chart illustrating operations of a second method for verifying the identity of a requestor or sender.

FIG. 4B is a flow chart illustrating operations of a first method for verifying the identity of a requestor. In some embodiments, the method of FIG. 5 can be used to verify the identity of a requestor when creating a financial account, and can represent step 410 of FIG. 4. The following description of FIG. 5 will be described using the system illustrated in FIG. 1B, and will refer to labels of that figure. This is a non-limiting example and is done with the intent of making the description of FIG. 4 easier to understand. Note that, in some embodiments, including the embodiment of FIG. 1B, all steps of the method of FIG. 5 can be carried out by PPS 108 and/or sender-requestor association component 110.

Step 402 includes receiving identity information for a requestor. Using the example of FIG. 3, PPS 108 and/or sender-requestor association component 110 receives identity information for sender 104. The identity information can include anything that will enable PPS 108 and/or sender-requestor association component 110 locate a database entry associated with sender 104. The identity information can include, for example, the name of sender 104, the address of sender 104, the social security number of sender 104, the driver's license number of sender 104, the state identification card number of sender 104, the passport number of sender 104, or a phone number for sender 104.

Step 404 includes locating a database entry associated with the requestor in a database. Step 404 can occur in response to step 402. Using the example of FIG. 3, PPS 108 and/or sender-requestor association component 110 can locate a database entry associated with sender 104 in a database. In some embodiments, PPS 108 includes a storage device containing a personal information database that associates the identity information with sender 104. PPS 108 and/or sender-requestor association component 110 can perform a database operation to locate a database entry associated with sender 104 in the personal information database.

In some embodiments, PPS 108 and/or sender-requestor association component 110 can communicate with another computer system that includes a storage device containing a personal information database that associates the identity information with sender 104. PPS 108 and/or sender-requestor association component 110 can locate a database entry associated with sender 104 in a database by transmitting the identity information to another computer system, and the other computer system can locate a database entry associated with sender 104 in a personal information database. For example, PPS 108 and/or sender-requestor association component 110 can communicate with a computer system of a credit reporting agency, such as Experian, Equifax, or TransUnion. PPS 108 and/or sender-requestor association component 110 can transmit the identity information for sender 104 to a computer system of a credit reporting agency, and the computer system of the credit reporting agency can locate a database entry associated with sender 104 in a personal information database.

Step 406 includes obtaining personal information from the database entry. Step 406 can occur after step 402 or 404. Using the example of FIG. 3, PPS 108 and/or sender-requestor association component 110 can obtain personal information from the database entry. In some embodiments, PPS 108 includes a storage device containing a personal information database that associates personal information with sender 104. PPS 108 and/or sender-requestor association component 110 can perform a database operation to obtain personal information associated with sender 104 from the personal information database.

In some embodiments, PPS 108 and/or sender-requestor association component 110 can communicate with another computer system that includes a storage device containing a personal information database that associates personal information with sender 104. PPS 108 and/or sender-requestor association component 110 can obtain personal information associated with sender 104 from the personal information database by sending a message to request personal information related to sender 104 to the other computer system. The other computer system can perform a database operation to obtain personal information associated with sender 104 from the personal information database.

For example, PPS 108 and/or sender-requestor association component 110 can send a message requesting personal information associated with sender 104 to a computer system of a credit reporting agency, such as Experian, Equifax, or TransUnion. The computer system of the credit reporting agency can perform a database operation to obtain personal information associated with sender 104 from a personal information database. The computer system of the credit reporting agency can transmit the personal information associated with sender 104 to PPS 108 and/or sender-requestor association component 110, resulting in PPS 108 and/or sender-requestor association component 110 obtaining personal information associated with sender 104 from the personal information database of the credit reporting agency.

Step 408 includes causing a personal question using the personal information to be created. Step 408 can occur in response to step 406. Using the example of FIG. 3, PPS 108 and/or sender-requestor association component 110 can cause a personal question using the personal information to be created. In some embodiments, PPS 108 and/or sender-requestor association component 110 can create the personal question using the personal information. In some embodiments, PPS 108 and/or sender-requestor association component 110 can transmit a message to another computer system that causes the other computer system to create a personal question using the personal information. The personal question can include, for example, what was sender 104's residence address five years ago and can list a number of possible answers to select from. As a second example, the personal question can include what is sender 104's current outstanding phone bill balance and can list a number of possible answers to select from.

Step 410 includes transmitting the personal question. Step 410 can occur in response to step 408. Using the example of FIG. 3, PPS 108 and/or sender-requestor association component 110 can transmit the personal question. For example, PPS 108 and/or sender-requestor association component 110 can transmit the personal question to PPS 108, or, when identifying object 390 is a mobile device, to the mobile device.

Step 412 includes receiving a response to the personal question. Step 412 can occur in response to step 410. Using the example of FIG. 3, PPS 108 and/or sender-requestor association component 110 can receive a response to the personal question. For example, sender 104 can answer the personal question using PPS 108, or, when identifying object 390 is a mobile device and the personal question was transmitted to the mobile device, using the mobile device. PPS 108 or the mobile device can transmit sender 104's response to the personal question to PPS 108 and/or sender-requestor association component 110, resulting in PPS 108 and/or sender-requestor association component 110 receiving a response to the personal question.

Step 414 includes verifying the response based on the personal information. Step 414 can occur in response to step 412. Using the example of FIG. 3, PPS 108 and/or sender-requestor association component 110 can verify the response based on the personal information. For example, if the personal question is "what was sender 104's residence address five years ago?", PPS 108 and/or sender-requestor association component 110 can use the personal information to determine sender 104's residence address five years ago, and can compare sender 104's response to the determined residence address.

Step 416 includes verifying the identity of the requestor based at least in part on the response to the personal question. Step 416 can occur in response to step 414. Using the example of FIG. 3, PPS 108 and/or sender-requestor association component 110 can verify the identity of the requestor based at least in part on the response to the personal question. For example, PPS 108 and/or sender-requestor association component 110 can determine whether sender 104 provided an answer to the personal question that matched the personal information from the personal information database. When sender 104's answer matches the personal information from the personal information database, it is more likely that sender 104 is the person associated with the identity information. When sender 104's answer does not match the personal information from the database, it is less likely that sender 104 is the person associated with the identity information. Computer system 180 can verify the identity of sender 104 based at least in part on sender 104's response to the personal question.

Figure 5:
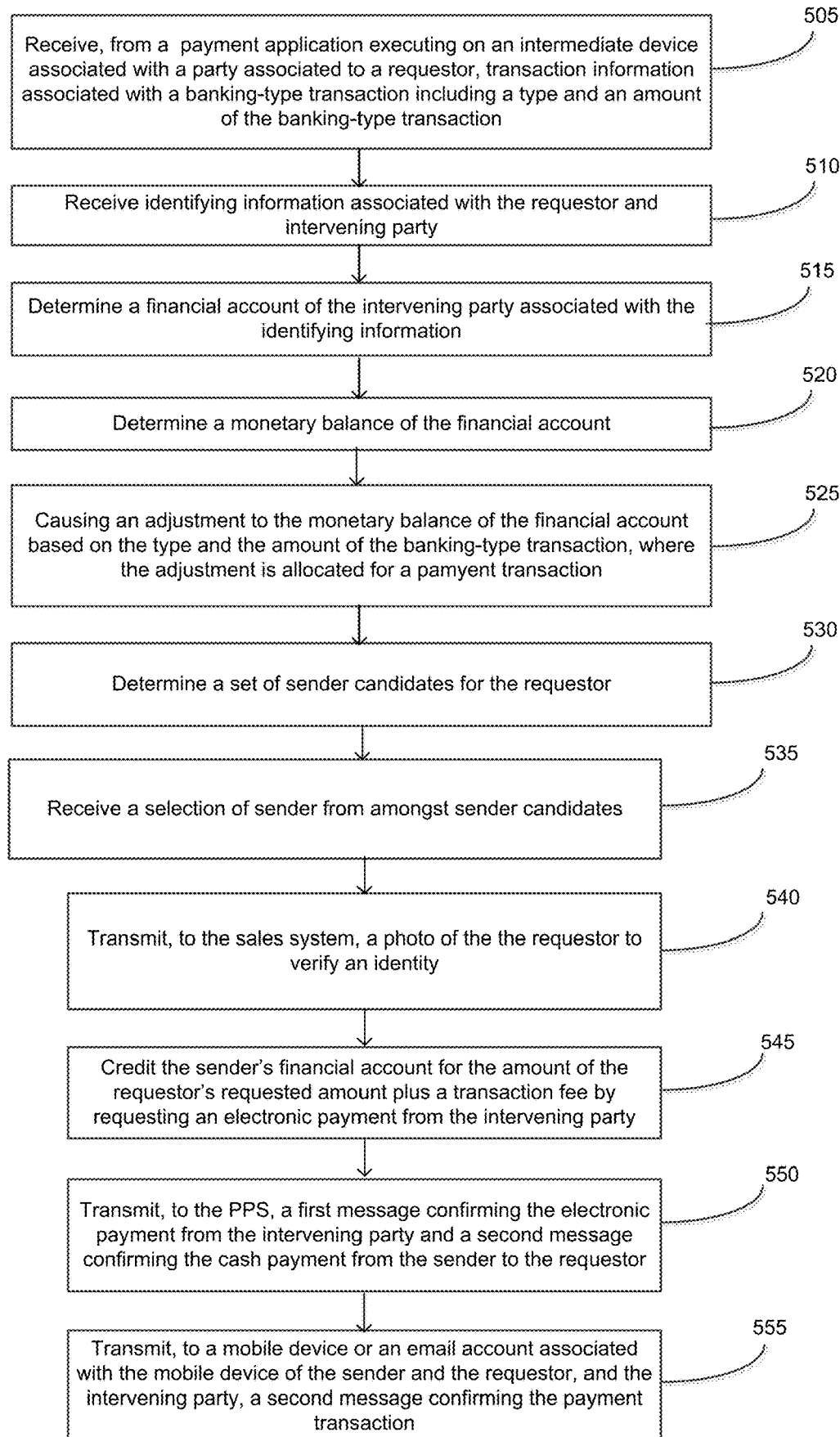
FIG. 5 is a flow chart illustrating operations for a requestor to make a monetary transaction in a multi-party scenario.

FIG. 5 is a flow chart illustrating operations for a requestor to make a monetary transaction via an intervening party. The following description of FIG. 5 will be described using the system illustrated in FIG. 1B, and will refer to labels of that figure. This is a non-limiting example and is done with the intent of making the description of FIG. 5 easier to understand. Note that, in some embodiments, including the embodiment of FIG. 1B, all steps of the method of FIG. 5 can be carried out by PPS 108 and/or sender-requestor association component 110.

Sender 104 can create a financial account using, for example, the method of FIG. 4A, which can also associate a passcode and a photo with the financial account. After creating the financial account, sender 104 can make a monetary or monetary transaction with sender 104. Examples of monetary or monetary transactions include deposits, withdrawals, loans, cash advances, transfers, opening accounts, and closing accounts, among others. In some embodiments, PPS 108 is controlled by or associated with a financial entity. The financial entity, in contrast to a bank or a credit union, may be prevented from holding funds (i.e., money) for requestors such as sender 104.

In some embodiments, PPS 108 is controlled by or associated with a financial entity. The financial entity, in contrast to a bank or a credit union, may be prevented from holding funds (i.e., money) for requestors such as sender 104. In some embodiments, a monetary balance of a requestor financial account of the financial entity can be held by a fund holding entity, such as a bank or a credit union, rather than by the financial entity. In some embodiments, the financial entity has a fund holding account, which can hold monetary balances of multiple requestor financial accounts, with the fund holding entity. The financial entity can maintain an accounting of the monetary balance of each requestor financial account of the multiple requestor financial accounts, while the funds for the multiple requestor financial account can be held by the fund holding company in the fund holding account. For example, the financial entity can have a bank account with a bank, the bank account can hold the monetary balances of all of the requestor financial accounts of the financial entity, and the financial entity can maintain an accounting of the monetary balance of each requestor financial account.

Step 705 includes receiving, by a payment processing system configured to be used by a sender and a requestor for peer to peer cash transfer, transaction information associated with a monetary transaction including a type and an amount of the monetary transaction. Using the example of FIG. 1B, the requestor 102 has no access to a payment application, however an intervening party 106 does. The intervening party 106 makes the request and in some cases, the electronic payment to the sender on behalf of the requestor.

Requestor 102 can make a monetary transaction, such as a deposit or a withdrawal, with sender 104. To make a deposit, sender 104 can provide deposit money to requestor based on the request submitted by the intervening party 106. In some embodiments, the identity of sender 104 or requestor 102 can be verified as part of making the deposit. For example, the identity of sender 104 can be verified using an embodiment of the method of FIG. 4A. In some embodiments, no identification of sender 104 is required to make a deposit. Identifying information, for example as discussed in the method of FIG. 4A or 4B, can be obtained from identifying device or user by PPS 108. PPS 108 can transmit the identifying information, along with the transaction information, to PPS 108 and/or sender-requestor association component 110. The transaction information can include the type of the monetary transaction (i.e., a deposit), and the amount of the deposit. The transmission results in PPS 108 and/or sender-requestor association component 110 receiving, from PPS 108, transaction information associated with the monetary transaction.

To make a withdrawal, sender 104 can make a withdrawal request for a specific amount of money (i.e., the amount of sender 104's withdrawal request) to PPS. In some embodiments, the identity of sender 104 can be verified as part of making the withdrawal. For example, the identity of sender 104 can be verified using an embodiment of the method of FIG. 6. In some embodiments, sender 104 can be known to sender 104, and no further identity verification of sender 104 is needed. Identifying information, for example as discussed in the method of FIG. 6, can be obtained from identifying object 390 by PPS 108. PPS 108 can transmit the identifying information, along with the transaction information to PPS 108 and/or sender-requestor association component 110. The transaction information can include the type of the monetary transaction (i.e., a withdrawal), and the amount of the withdrawal. The transmission results in PPS 108 and/or sender-requestor association component 110 receiving, from PPS 108, transaction information associated with the monetary transaction.

Step 510 includes receiving identifying information associated with the requestor. Step 510 can occur before or after step 505. Using the example of FIG. 3, identifying information, for example as discussed in the method of FIG. 6, can be obtained from identifying object 390 by PPS 108. PPS 108 can transmit the identifying information to PPS 108 and/or sender-requestor association component 110, resulting in PPS 108 and/or sender-requestor association component 110 receiving the identifying information, which is associated with sender 104.

Step 515 includes determining a financial account associated with the identifying information. Step 515 can occur in response to step 510. Using the example of FIG. 3, PPS 108 can include a storage device containing a mapping database associating identifying information with financial accounts. PPS 108 and/or sender-requestor association component 110 can determine the financial account associated with the identifying information by performing a database operation to determine the financial account associated with the identifying information.

Step 520 includes determining a monetary balance of the financial account. Step 520 can occur after step 515 or in response to step 505. Using the example of FIG. 3, PPS 108 can include a storage device containing a mapping database associating monetary balances with financial accounts. PPS 108 and/or sender-requestor association component 110 can determine the monetary balance of the financial account by performing a database operation using the mapping database.

Step 525 includes causing an adjustment to the monetary balance of the financial account based on the type and the amount of the monetary transaction. For example, PPS 108 and/or sender-requestor association component 110 can increase the monetary balance of the financial account by the amount of the deposit, or by the amount of the deposit less a transaction fee (i.e., by an amount less than the deposit amount), or by some other amount based on the amount of the deposit. As a second example, PPS 108 and/or sender-requestor association component 110 can cause the adjustment by sending a message to a second computer system that causes the second computer system to adjust the monetary balance.

In addition to adjusting the financial account associated with sender 104, PPS 108 and/or sender-requestor association component 110 can cause an adjustment to a different financial account, the different financial account associated with sender 104 (i.e., sender 104's financial account). When the monetary transaction is a deposit transaction, PPS 108 and/or sender-requestor association component 110 can adjust the monetary balance of sender 104's financial account by decreasing the monetary balance based on the deposit amount. For example, PPS 108 and/or sender-requestor association component 110 can decrease the monetary balance of sender 104's financial account by the amount of the deposit, or by the amount of the deposit less a transaction fee (i.e., by an amount smaller than the deposit amount), or by some other amount based on the amount of the deposit.

When the monetary transaction is a withdrawal transaction, PPS 108 and/or sender-requestor association component 110 can cause the adjustment of the monetary balance of the financial account by decreasing the monetary balance based on the withdrawal amount. For example, PPS 108 and/or sender-requestor association component 110 can decrease the monetary balance of the financial account by the amount of the withdrawal, or by the amount of the withdrawal plus a transaction fee (i.e., by an amount larger than the withdrawal amount), or by some other amount based on the amount of the withdrawal.

In addition to causing the adjustment of the financial account associated with sender 104, PPS 108 and/or sender-requestor association component 110 can cause the adjustment of sender 104's financial account. When the monetary transaction is a withdrawal transaction, PPS 108 and/or sender-requestor association component 110 can adjust the monetary balance of sender 104's financial account by increasing the monetary balance based on the deposit amount. For example, PPS 108 and/or sender-requestor association component 110 can increase the monetary balance of sender 104's financial account by the amount of the deposit, or by the amount of the deposit plus a transaction fee (i.e., by an amount larger than the deposit amount), or by some other amount based on the amount of the deposit.

Step 530 includes determining which amongst the sender is a good candidate for the requestor. For example, based on conditions levied by the requestor and/or sender, such as location preference, etc., the sender is paired with the requestor in increasing or decreasing order of preference. Each of the sender identities may their photo for easy identification and similarly the requestor identities may also be sent to the sender.

At 535, a requestor or sender relationship is set, for example, by a requestor selecting a sender or by sender initiating or confirming connection. Once the relationship is set, e.g., temporarily for a defined period of time, the requestor can reach out to the sender and obtain physical cash.

At 540, the sender's account is credited with an amount of the requestor's cash deposit plus a transaction fee. The financial account information may be connected to the sender payment application within the PPS 108.

Step 545 includes transmitting, to the payment processing system, a first message confirming the cash deposit. Step 545 includes transmitting, to a mobile device and/or an email account associated with the mobile device, a second message confirming the cash deposit.

Step 555 includes transmitting a confirmation message to confirm the monetary transaction. Step 555 can occur in response to step 525. Using the example of FIG. 3, PPS 108 and/or sender-requestor association component 110 can transmit a confirmation message to confirm the monetary transaction. In one implementation, the confirmation may be as a confirmation received from the sender or requestor as a text or email notification. In another implementation, the location of the sender or requestor indirectly indicates that an exchange has been consummated. In yet another implementation, gesture information indicating that the sender and the requestor have consummated the physical monetary transaction may be used as confirmation. The gesture information can be tracked by the devices of the sender or requestor, such as phones or wearable devices, and can be triggered when the participants high-five or handshake or perform other such gestures.

Figure 6:
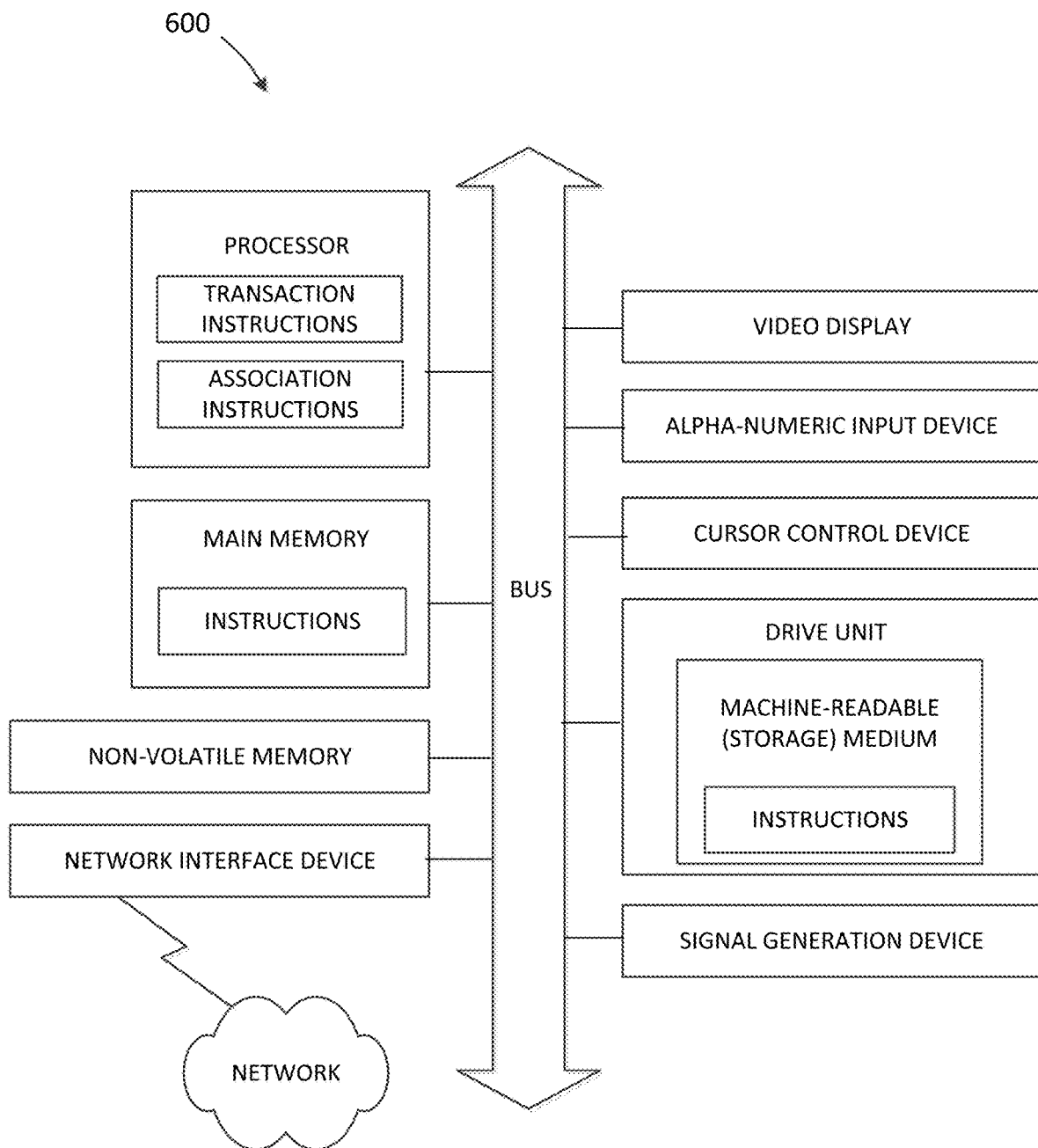
FIG. 6 is a diagrammatic representation of a machine in the example form of a computer system within which a set of instructions, for causing the machine to perform any one or more of the methodologies or components discussed herein, may be executed.

FIG. 6 is a diagrammatic representation of a machine in the example form of a computer system within which a set of instructions, for causing the machine to perform any one or more of the methodologies or components discussed herein, may be executed. In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIGS. 1-6 (and any other components described in this specification) can be implemented. The computer system 600 can be of any applicable known or convenient type. The components of the computer system 600 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-component (COM) or system-on-component (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate. It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 800. The interface can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 6 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smart phone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or components of the presently disclosed technique and innovation.

In general, the routines executed to implement the embodiments of the disclosure, may be implemented as part of an operating system or a specific application, component, program, object, component or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of embodiments of the present invention. One skilled in the art will appreciate that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

What is claimed is:

1. A computer-implemented method comprising:
receiving, by a payment processing system (PPS), a request for a cash amount to be provided to a requestor user, the request originating from a first instance of a payment application provided by the PPS and executing on an intervening user device associated with an intervening user, wherein the intervening user is associated with the requestor user;
receiving, by the PPS, first location data indicating a first location of a requestor device of the requestor user, the intervening user device having transmitted the request and the first location data of the requestor device to the PPS, the requestor device including a first location sensor for generating the first location data;
receiving, by the PPS from a plurality of sender devices, second location data indicating respective locations of respective individual sender devices of the plurality of sender devices, the individual sender devices including respective second location sensors for generating the respective locations of the respective individual sender devices;

determining, by the PPS, a preferred sender associated with a preferred sender device, wherein:

the preferred sender is capable of offering at least a portion of the cash amount to the requestor user, the preferred sender is determined based on at least one of a cash balance of a sender or release timing indicating how fast the portion of the cash amount can be released;

receiving, by the PPS, third location data of the preferred sender device indicating a new location of the individual preferred sender device;

upon determining that the new location is within a threshold distance from the first location, providing, by the PPS and via the first instance of the payment application executing on the intervening user device, a user interface to receive a numerical value corresponding to the cash amount to initiate an electronic transfer of the numerical value corresponding to the cash amount from a financial account of the intervening user to a preferred sender financial account via the payment processing system, wherein the financial account of the intervening user and the preferred sender financial account are each associated with the PPS;

sending, by the PPS to a second instance of the payment application executing on the preferred sender device, the request for the cash amount including information identifying the requestor user and the numerical value of the cash amount; and receiving, by the PPS, a confirmation from the intervening user device that the requestor user has received the cash amount.

2. The method of claim 1, wherein the method further comprises:

receiving, from the preferred sender device, information identifying the preferred sender;

receiving, from the first instance of the payment application executing on the intervening user device, information identifying the intervening user; and determining, by the PPS, the financial account of the preferred sender and the financial account of the intervening user based on an association between the identifying information identifying the intervening user and the financial account.

3. The method of claim 1, wherein the preferred sender is determined further based on applying an association model that associates one or more senders corresponding to the plurality of senders with the requestor user based on predetermined criteria including a relationship between the requestor user and the one or more senders, a distance separating the requestor user and the one or more senders, a preference of the one or more senders, a preference of the requestor, a degree of social network separation between the one or more senders and the intervening user, a degree of social network separation between the one or more senders and the requestor user, ratings of the one or more senders, availability of the one or more senders, time of day, or a release timing related to how fast the one or more senders can dispense the cash amount to the requestor user.

4. A method comprising:

receiving, from a device of an intervening user on behalf of a requestor, a request for an amount of funds as part of a monetary transaction and a location of the device of the requestor;

determining, by a payment processing system (PPS), one or more senders capable of physically furnishing at least a portion of the amount of funds requested as part of the monetary transaction, based on respective cash balance values associated with the one or more senders and indicated in respective payment applications executing on each one of a plurality of sender devices respectively corresponding with the one or more senders, the respective cash balance values indicating the respective amounts of physical cash that the one or more senders are capable of furnishing to the requestor;

obtaining by the PPS, via the respective payment applications executing on each of the plurality of sender devices, respective locations of the one or more sender devices;

determining, by the PPS, a preferred sender of the one or more senders based on a cash balance of a sender or release timing;

upon determining that an updated location of the preferred sender device is within a threshold distance from the location of the requestor device, receiving, by the PPS and from the device of the intervening user, a confirmation that the requestor has received an amount of physical cash from the sender, wherein the amount of physical cash corresponds to at least a portion of the amount of funds requested; and transferring, by the PPS, an amount of funds equal to the amount of physical cash delivered by the preferred sender to the requestor, from a first stored balance associated with the intervening user to a second stored balance associated with the preferred sender, wherein the first stored balance and the second stored balance are maintained by the PPS.

5. The method of claim 4, wherein the intervening user is determined from a list of contacts associated with the requestor, the method further comprising:

determining an order of the list of contacts based on one or more ranking factors; and providing the list of contacts in a user interface of a payment application executing on a device of the requestor based on the determined order.

6. The method of claim 5, wherein the one or more ranking factors include at least one of:

whether a contact of the list of contacts is associated with an existing service account of the payment application;

whether the contact has participated in a transaction associated with the payment application;

whether the contact has been associated with the payment application;

a relationship between the contact and the sender; and whether the contact is within a proximity of the sender.

7. The method of claim 4, further comprising:

receiving, from the respective payment applications associated with the one or more sender devices of the one or more senders, information identifying the one or more senders;

receiving, from the payment application executing on a device associated with the intervening party, information identifying the intervening party;

determining, by the PPS, one or more respective financial accounts of the one or more senders, based on an association between the information identifying the one or more senders and one or more financial accounts respectively corresponding to the one or more senders; and determining, by the PPS, a financial account of the intervening party based on an association between the information identifying the intervening party and the financial account of the intervening party.

8. The method of claim 4, wherein the PPS is controlled by an entity other than a bank or a credit union.

9. The method of claim 4, further comprising:
determining the respective cash balance values based on current, previous, or predicted transaction history of the one or more senders with the PPS.

10. The method of claim 4, further comprising:
receiving an identification code from the device of the requestor and the preferred sender device; and
verifying that the identification code is valid at a time of delivery of the physical cash.

11. The method of claim 4, further comprising: responsive to determining that the requestor does not have an account associated with a payment application installed on the device of the requestor, transmitting a first invitation to the requestor to submit requestor financial account information and to register a service account associated with the payment application installed on the device of the requestor.

12. The method of claim 4, further comprising:
sending, by the PPS, a photo provided by the requestor to the preferred sender to enable the preferred sender to verify an identity of the requestor.

13. The method of claim 4, further comprising receiving a confirmation from the sender or the requestor, the receiving the confirmation comprising:
receiving, by the PPS from the preferred sender device and the device associated with the requestor, gesture information indicating that the preferred sender and the requestor have consummated the delivery of the physical cash to the requestor.

14. A payment system comprising:
one or more processors;
one or more non-transitory computer-readable media storing instructions executable by the one or more processors, wherein the instructions, program when executed by the one or more processors, cause the one or more processors to perform actions comprising:
receiving, from a device of an intervening user on behalf of a requestor, a request for an amount of funds in association with a monetary transaction and a location of the device of the requestor;
determining, by a payment processing system (PPS), a preferred sender capable of physically furnishing at least a portion of the amount of funds based on a cash balance value associated with the preferred sender in a payment application executing on a preferred sender device corresponding with the preferred sender, the cash balance value indicating an amount of physical cash that the preferred sender is capable of furnishing to the requestor, wherein the preferred sender device is selected from a plurality of sender devices based on at least one of a cash balance of a sender or release timing;
obtaining by the PPS, via the payment application executing on the preferred sender devices, a location of the preferred sender device;
determining by the PPS that a new location of the preferred sender device is within a threshold distance from the location of the requestor device; and
transferring, by the PPS, an amount of funds equal to the physical cash delivered by the preferred sender to the requestor from a first stored balance associated with the intervening user to a second stored balance associated with the preferred sender.

15. The payment system of claim 14, wherein the actions further comprise:
receiving, by the PPS from both the preferred sender device and the device associated with the requestor, gesture information indicating that the sender and the requestor have consummated the delivery of the physical cash to the requestor.

* * * * *